United States Patent [19]

Warner

[11] Patent Number: 5,196,927
[45] Date of Patent: Mar. 23, 1993

[54] METHOD FOR ELECTRONIC COLOR PROCESSING

[75] Inventor: George T. Warner, Lititz, Pa.

[73] Assignee: E. I. Du Pont de Nemours and Company, Wilmington, Del.

[21] Appl. No.: 494,463

[22] Filed: Mar. 16, 1990

[51] Int. Cl.$^5$ ............................................. G03F 3/00
[52] U.S. Cl. ......................................................... 358/80
[58] Field of Search ...................... 358/75, 80; 250/226

[56] References Cited

U.S. PATENT DOCUMENTS

| | | | |
|---|---|---|---|
| 4,335,398 | 6/1982 | Yamada | 358/80 |
| 4,409,614 | 10/1983 | Eichler et al. | 358/76 |
| 4,481,532 | 11/1984 | Clark et al. | 358/80 |
| 4,613,897 | 9/1986 | Stansfield | 358/80 |
| 4,647,963 | 3/1987 | Johnson et al. | 358/80 |
| 4,698,691 | 10/1987 | Suzuki et al. | 358/283 |
| 4,731,671 | 3/1988 | Alkofer | 358/284 |

*Primary Examiner*—Leo H. Boudreau
*Attorney, Agent, or Firm*—J. E. Griffiths

[57] ABSTRACT

The present invention relates to a method for adjusting original color signal values for n colors in a color separation system and, more particularly, to a computer implemented method for adjusting the original values based on color interaction.

17 Claims, 5 Drawing Sheets

METHOD FOR ELECTRONIC COLOR PROCESSING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to a method for adjusting original color signal values for n colors in a color separation system and, more particularly, to a computer implemented method for adjusting the original values based on color interaction.

2. Description of Related Art

In the reproduction of color images, particularly through printing, it has long been known to analyze an original multicolored image, separate the original image colors into a number of primary colors, and to recombine the separated colors in a single colored image to reconstruct the original.

Today, in the most commonly used reproduction processes, the original multicolored image is scanned with a light beam using an image analyze scanner to obtain an electronic signal containing image information in the form of signal intensity level or density variations corresponding to elemental picture areas, known as pixels, of the original picture. The image is scanned through separate sets of colored filters to produce four separate image signals, corresponding to three primary colors and black. The chosen primary colors are typically cyan, magenta and yellow. The output signals are then converted into digital signals and either stored in a memory or used directly to drive an exposing device.

The exposing device may produce black and white film transparencies, corresponding to each of the cyan, magenta, yellow and black color separation signals, known as color separation transparencies or color separations for short. The color separations are used to make printing plates. The printing plates are mounted on a printing press to print, in registration, four overlapping single colored images to reconstruct the multicolored original.

The electronic output signals may also be used to directly drive a color printer to produce a reconstructed multicolored original without ever producing actual color separations or printing plates.

In the process of analyzing and reconstructing the original multicolored image, there are a number of difficulties, some of which have been overcome and some of which remain. One problem is the lack of an exact match between the inks used in printing and the dyes in the original, which is usually a colored photographic transparency or a colored picture. In addition, the filters used to produce the color separations are imperfect. Another problem resides in the printing process itself, whether on a traditional press, an ink jet type device, or a sublimable type printer. This problem is the error of dot gain which is well known in the printing industry. Dot gain refers to the printing of greater or lesser amounts of a given color than what is called for, and results in shifting of the color density and or hues of the colors in the reconstructed image.

It is theoretically possible to correct for the above problems by appropriately modifying the signals used to produce the color separations. However, past efforts to correct such color inaccuracies by modifying the analyze scanner output were only partially successful because they were directed to an analysis of the individual pure color signals, i.e., the magenta, the yellow, the cyan and the black image signals. Each of the signals is corrected for each color individually, using correction coefficients, such as, from a look-up table which are used to modify each signal so that various densities of pure magenta, yellow, cyan and black test patches placed on the original image are reproduced accurately after printing. This approach, however, is somewhat limited since modifying any one of the four color separation signals effects not only the purity of that color, but the hues of each and every color combination in which it is a part thereof. There is, thus, still need for some method to correct the electronic color separation signals prior to printing to accurately reproduce the original hues and color gradations.

It is, therefore, an object of this invention to provide a process for adjusting the output values of color separation data output of a color separation device to more accurately reproduce an original image following printing.

SUMMARY OF THE INVENTION

This invention relates to a method for processing original color separation image density values of pixels of an original image, the number of the original values corresponding to a first set of n colors, where n is at least 2, comprising:

generating, for each pixel, two matrixes, a 1 by $2^n-1$ matrix V of intermediate color values relating to the original values for the first set of n colors, and a 1 by $2^n-1$ matrix D of color indexes also relating to the original values for the first set of n colors, and calculating, for each pixel, a corrected set of n color separation values, $F_i = \{F_1, F_2, \ldots, F_n\}$, utilizing the generated matrix $V_j$ of intermediate color values, the generated matrix $D_j$ of color indexes, and coefficients $E_{ijDj}$ selected from a three dimensional matrix $E_{ijm}$ of preselected color coefficients utilizing the equation:

$$F_i = \sum_{j=1}^{2^n-1} (V_j)(E_{ijDj}).$$

In a particular case, the invention relates to a method for processing original color separation image density values of pixels of an original image, the number of the original values corresponding to a first set of 4 colors, comprising:

generating, for each pixel, two matrixes, a 1 by 8 matrix V of intermediate color values relating to the original values for the first set of 4 colors, and a 1 by 8 matrix D of color indexes also relating to the original values for the first set of 4 colors, and calculating, for each pixel, a corrected set of 4 color separation values, $F_i = \{F_1, F_2, F_3, F_4\}$, utilizing the generated matrix $V_j$ of intermediate color values, the generated matrix $D_j$ of color indexes, and coefficients $E_{ijDj}$ selected from a three dimensional matrix $E_{ijm}$ of preselected color coefficients utilizing the equation:

$$F_i = \sum_{j=1}^{8} (V_j)(E_{ijD_j}).$$

BRIEF DESCRIPTION OF THE DRAWINGS

The invention can be more fully understood from the following detailed description thereof in connection with accompanying drawings which form a part of this application.

DESCRIPTION OF THE PREFERRED EMBODIMENT(S)

Figure 1:
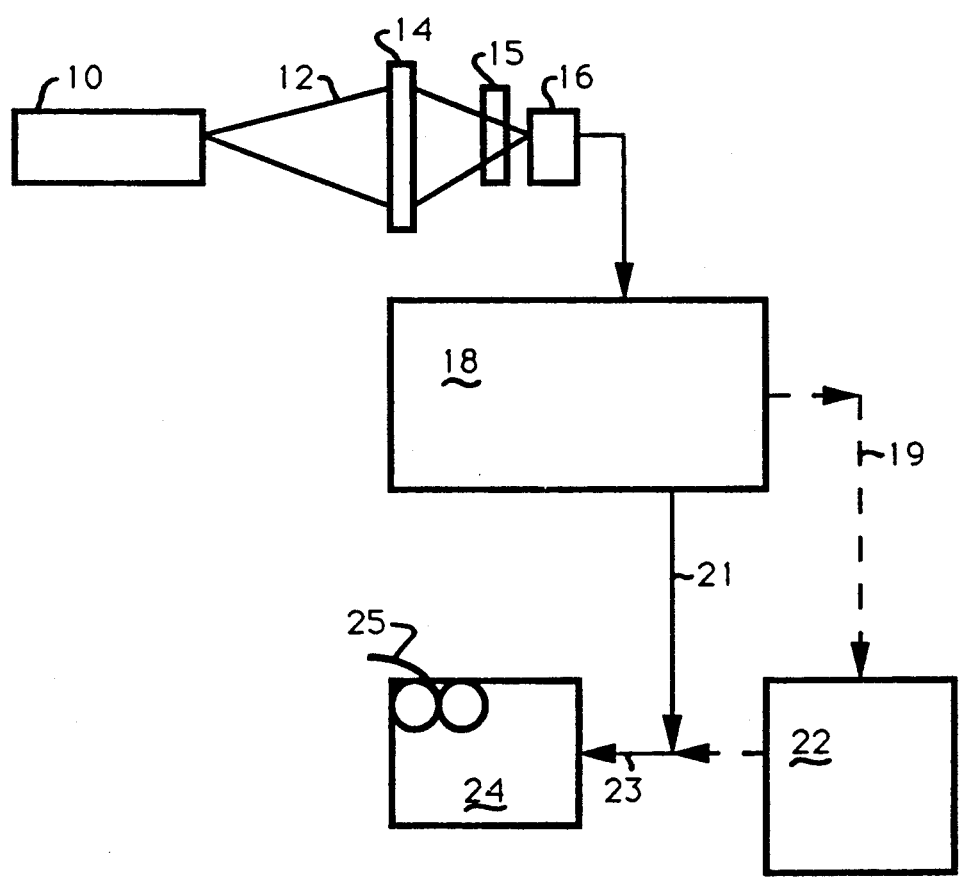
FIG. 1 represents a schematic simplified diagramatic representation of a color image reproduction system in which the present invention may be implemented.

Throughout the following detailed descripton, similar reference characters refer to similar elements in all figures of the drawings.

Referring to FIG. 1, there is shown an assembly of various electronic or other machine elements typically used by the graphic arts industry to faciliate image reproduction and most often colored image reproduction. It should be understood that the depicted system is extremely primitive and should not be considered as limiting to the present invention, but the depicted system is simply used as an aid to this description so as to better understand the scope of the invention. In view of that purpose, an image analyze scanner 8 is shown comprising in combination means 10 for generating and directing a beam 12 of light for illuminating an image that we intend to eventually reproduce, which may be a colored transparency 14. The generating and directing means 11 can, for instance, cause the beam 12 to scan the transparency 14 in a sequential raster fashion. A light detector 16 can be used to collect the light and generate an electrical video signal output which contains image information for each picture element or pixel of the transparency 14. A filter wheel 15 can contain a plurality of filters, such as 3 filters and a clear space, positioned between the transparency 14 and the detector 16 to filter the beam 12 passing through the transparency 14, so that specific image information for each of three preselected colors, i.e., magenta, cyan and yellow, as well as black is obtained for each scanned picture element.

The information for the four colors, black being also considered a color comprising a gray scale of tones such as are found in a black and white picture, may be obtained simultaneously and outputted in four parallel channels, by splitting the beam 12 through the filters in the filter wheel 15 and using four detectors, or it may be sequential, each color obtained after a complete scan of the image, or any other variation. In the preferred embodiment, an analog to digital converter 17 will be included in the detector 16 to provide a digital output image density signal value for each of the four colors for each pixel. For each pixel, we shall identify the output values from the detector 16 as original color separation image density values.

Regardless of the apparatus and method employed, original color separation image density values are obtained or generated for each picture element or pixel of an original image where the number of the original values for each pixel corresponds to a first set of n colors, where n is at least 2. Typically, n is 3, 4 or 5. Preferably, the first set of colors comprise cyan, magenta and yellow. More preferably, the first set of colors consist of cyan (C), magenta (M), yellow (Y) and black (K), where black is defined as a color. When the first set of colors comprises cyan, magenta, yellow and black, the original color separation image density values are referred hereafter as values $C_o$, $M_o$, $Y_o$ and $K_o$ for the cyan, magenta, yellow and black separations, respectively. There are $C_o$, $M_o$, $Y_o$ and $K_o$ values for each pixel.

The first step of a first embodiment of the present invention is generating, for each pixel, a 1 by $2^n-1$ matrix $D_j$ (otherwise referred to as matrix D) of color indexes and a 1 by $2^n-1$ matrix $V_j$ (otherwise referred to as matrix V) of intermediate color values, both relating to the original values of the first set of n colors.

The matrix $V_j$ of intermediate color values is comprised of $2^n-1$ values each equal to the amount of the intermediate colors found in the first set of n colors The $2^n-1$ intermediate colors correspond to every possible combination of 1 or more of the n colors found in the first set of n colors.

For example, if n=4 and the first set of n colors is composed of cyan (C), magenta (M), yellow (Y), and black (K), there would be $2^n-1$ possible combinations of one or more colors. Specifically these combinations would be: C, M, Y, K, MY, CM, CY, CK, MK, YK, CMY, MYK, CMK, CYK, and CMYK.

The $2^n-1$ values for matrix $V_j$ are found by first finding the amount of the intermediate color which contains all n original colors. This can be done by finding the minimum value of the n original values of the first set of n colors. Secondly, the intermediate colors comprised of combinations of n−1 colors are found by finding the minimum value of the n−1 colors in the combination and subtracting the value of the n combination intermediate color found in the first step. For the n−2 case, if it exists, the minimum value is found for each of the n−2 color combinations, then the contribution of the corresponding non-zero n−1 color and the n color are subtracted. This process continues until n intermediate color values have been found. The remaining $(2^n-1)-n$ values are zero. The resulting matrix $V_j$ will contain no more than n non-zero values.

Figure 2:
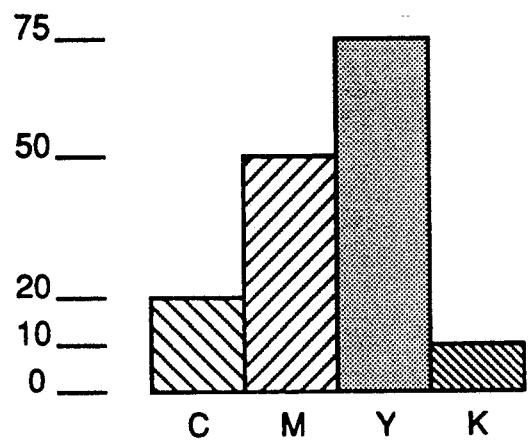
FIG. 2 is a graph illustrating an example where the original color separation image density values are depicted vertically in arbitrary units verses four colors shown horizontally adjacent to one another.

For example, consider the case where n=4 and the first set of colors is composed of cyan, magenta, yellow, and black where $C_o=20$, $M_o=50$, $Y_o=75$, and $K_o=10$. These numerical values represent color densities, and vary from 0 percent, i.e., the absence of any color to 0 percent, i.e., complete coverage of the area or the pixel by the color at issue. The range, therefore, is from 0 to 100. This example is illustrated in FIG. 2. In FIG. 2, the original color separation image density values $C_o=20$, $M_o=50$, $Y_o=75$, and $K_o=10$ are depicted vertically in arbitrary units from a horizontal baseline indicated as "0". The four colors Cyan (C), Magenta (M), Yellow (Y), and Black (K) are shown horizontally adjacent to one another.

Figure 3:
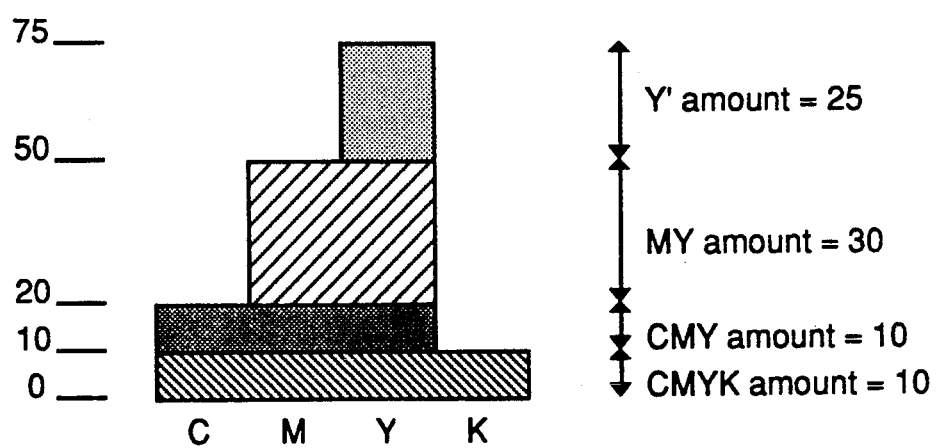
FIG. 3 is a graph illustrating the meaning of "intermediate color values" as used in this disclosure.

When viewed as combinations of one or more colors, the example looks as shown in FIG. 3. FIG. 3 depicts intermediate color values for the intermediate colors Y', MY, CMY and CMYK to be 25, 30, 10 and 10, respectfully.

CMYK is the intermediate color comprised of all n original colors. Its value is obtained by finding the minimum value of $C_o$, $M_o$, $Y_o$, and $K_o$. The non-zero intermediate color comprised of a combination of $n-1$ original colors is, in this case, CMY. It is obtained by finding the minimum value of $C_o$, $M_o$, and $Y_o$ and subtracting out the CMYK contribution already accounted for. The non-zero intermediate color comprised of a combination of $n-2$ original colors is, in this case, MY. It is obtained by finding the minimum value of $M_o$, and $Y_o$ and subtracting out the CMY and the CMYK contributions already accounted for. Lastly, the non-zero intermediate color comprised of a combination of $n-3$ original colors is, in this case, Y'. It is obtained by taking the value of $Y_o$ and subtracting out the MY, CMY and CMYK contributions already accounted for. Thus, n intermediate color values have been found. All other values in the V matrix of intermediate colors are zero.

For the case where $n=4$ and the first set of colors is composed of cyan (C), magenta (M), yellow (Y), and black (K) and where the matrix V is a 1 by 15 matrix, the V matrix is found as follows:

| | |
|---|---|
| $V_{15} = \min(C_o, M_o, Y_o, K_o)$ | (Value for CMYK) |
| $V_{14} = \min(C_o, Y_o, K_o) - V_{15}$ | (Value for CYK) |
| $V_{13} = \min(C_o, M_o, K_o) - V_{15}$ | (Value for CMK) |
| $V_{12} = \min(M_o, Y_o, K_o) - V_{15}$ | (Value for MYK) |
| $V_{11} = \min(C_o, M_o, Y_o) - V_{15}$ | (Value for CMY) |
| $V_{10} = \min(Y_o, K_o) - V_{12} - V_{14} - V_{15}$ | (Value for YK) |
| $V_9 = \min(M_o, K_o) - V_{12} - V_{13} - V_{15}$ | (Value for MK) |
| $V_8 = \min(C_o, K_o) - V_{13} - V_{14} - V_{15}$ | (Value for YK) |
| $V_7 = \min(C_o, M_o) - V_{11} - V_{13} - V_{15}$ | (Value for CM) |
| $V_6 = \min(C_o, Y_o) - V_{11} - V_{14} - V_{15}$ | (Value for CY) |
| $V_5 = \min(M_o, Y_o) - V_{11} - V_{12} - V_{15}$ | (Value for MY) |
| $V_4 = K_o - V_8 - V_9 - V_{10} - V_{12} - V_{13} - V_{14} - V_{15}$ | (Value for K) |
| $V_3 = Y_o - V_5 - V_7 - V_{10} - V_{11} - V_{12} - V_{14} - V_{15}$ | (Value for Y) |
| $V_2 = M_o - V_5 - V_6 - V_9 - V_{11} - V_{12} - V_{13} - V_{15}$ | (Value for M) |
| $V_1 = C_o - V_6 - V_7 - V_8 - V_{11} - V_{13} - V_{14} - V_{15}$ | (Value for C) | where $\min(x, y)$ denotes a function which returns the minimum value of x or y.

The matrix $D_j$ of color indexes is comprised of values equal to the maximum value of the intermediate colors found in the previous step. The values of the color indexes can be found at the same time the V matrix intermediate color values are found. Only the n index values corresponding to the non-zero intermediate color values are significant; the others can be set to zero or ignored, since they have no contribution to the output colors.

For the case where $n=4$ and the first set of colors is composed of cyan (C), magenta (M), yellow (Y), and black (K) and where the matrix D is a 1 by 15 matrix, the matrix D is found as follows:

| | |
|---|---|
| $D_{15} = \min(C_o, M_o, Y_o, K_o)$ | (Index for CMYK), |
| $D_{14} = \min(C_o, Y_o, K_o)$ | (Index for CYK), |
| $D_{13} = \min(C_o, M_o, K_o)$ | (Index for CMK), |
| $D_{12} = \min(M_o, Y_o, K_o)$ | (Index for MYK), |
| $D_{11} = \min(C_o, M_o, Y_o)$ | (Index fr CMY), |
| $D_{10} = \min(Y_o, K_o)$ | (Index for YK), |
| $D_9 = \min(M_o, K_o)$ | (Index for MK), |
| $D_8 = \min(C_o, K_o)$ | (Index for YK), |
| $D_7 = \min(C_o, M_o)$ | (Index for CM), |
| $D_6 = \min(C_o, Y_o)$ | (Index for CY), |
| $D_5 = \min(M_o, Y_o)$ | (index for MY), |
| $D_4 = K_o$ | (Index for K), |
| $D_3 = Y_o$ | (Index for Y), |
| $D_2 = M_o$ | (Index for M), and |
| $D_1 = C_o$ | (Index for C). |

Figure 4:
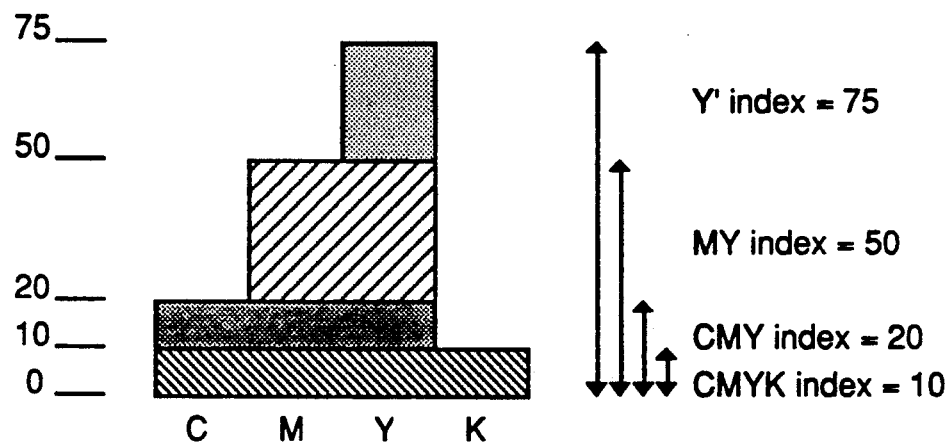
FIG. 4 is a graph illustrating the meaning of "color indexes" as used in this disclosure.

For example, consider the same case above where $n=4$ and the first set of colors is composed of cyan, magenta, yellow, and black where $C_o=20$, $M_o=50$, $Y_o=75$, and $K_o=10$. For this example, FIG. 4 depicts the index values for the intermediate colors Y', MY, CMY and CMYK as being 75, 50, 20 and 10, respectively.

What the first step of the process has effectively done is broken the original colors up into multi-color groups (where possible) and found the amounts and maximum levels of those groups.

The second step of the present invention is calculating, for each pixel, a corrected set of n color separation values, $F_i = \{F_1, F_2, \ldots, F_n\}$, utilizing the generated matrix $V_j$ of intermediate color values, the generated matrix $D_j$ of intermediate color indexes, and coefficients $E_{ijDj}$ selected from a three dimensional matrix $E_{ijm}$ of preselected color coefficients utilizing the equation:

$$F_i = \sum_{j=1}^{2^n-1} (V_j)(E_{ijDj}).$$

The corrected set of n color separation values, $F_i = \{F_1, F_2, \ldots, F_n\}$, includes one corrected value for each of the original values. When the original color separation image density values are $C_o$, $M_o$, $Y_o$, and $K_o$, the corresponding corrected color separation image density values can be referred to as $F_1$ (or $F_C$), $F_2$ (or $F_M$), $F_3$ (or $F_Y$), and $F_4$ (or $F_K$), respectively.

The matrix $E_{ijm}$ is a three dimensional matrix which consists of n rows i and $2^n-1$ columns j of predetermined or preselected color coefficients for each of m gradation levels where m is a number of distinct gradation levels for which there is a set of $E_{ij}$ coefficients.

Figure 5:
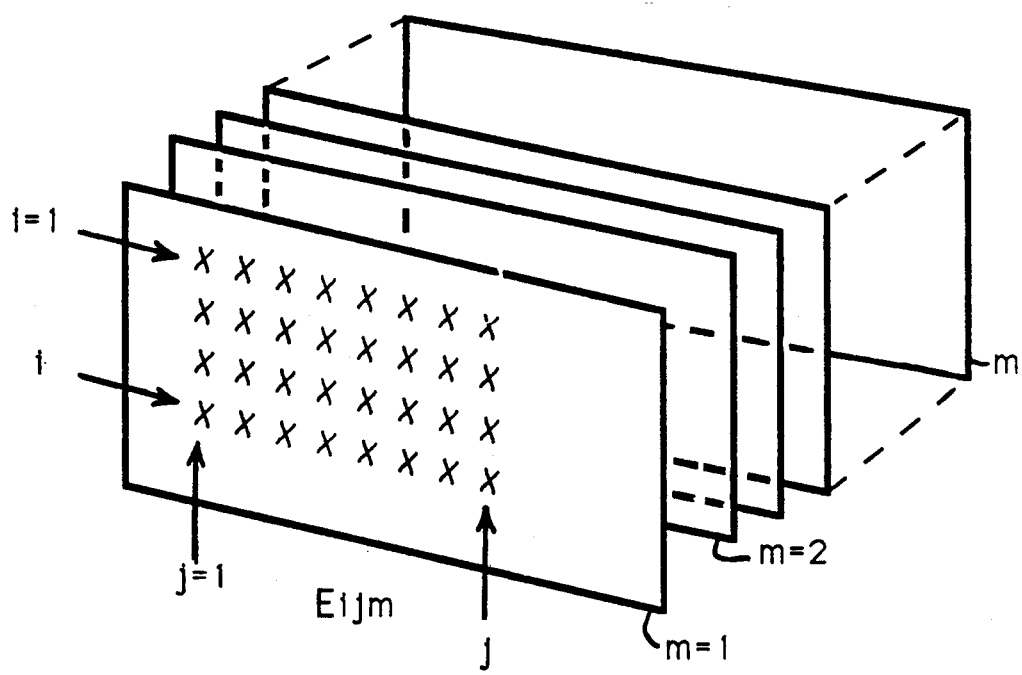
FIG. 5 is a schematic representation of a three dimensional matrix $E_{ijn}$ of coefficients as used in this invention.

FIG. 5 schematically illustrates the matrix $E_{ijm}$ where the first set of colors comprise cyan, magenta, yellow and black. In this case, the matrix $E_{ijm}$ consists Of four rows i and fifteen columns j for each of the m gradation levels. This is a 4 by 15 by m matrix which varies in a preselected manner with respect to the color gradation level.

The corrected set of four color separation values, $F_i = \{F_1, F_2, F_3, F_4\}$, for the example original values previously provided can, thus, be calculated using the following equation:

$$F_i = \sum_{j=1}^{2^n-1} (V_j)(E_{ijDj}).$$

Using the original values for the present example, we calculate $F_1$, for instance, as follows:

$$\begin{aligned}
F_1 = F_C &= (V_1)(E_{1,1,D_1}) + (V_2)(E_{1,2,D_2}) + (V_3)(E_{1,3,D_3}) + \\
&\quad (V_4)(E_{1,4,D_4}) + (V_5)(E_{1,5,D_5}) + (V_6)(E_{1,6,D_6}) + \\
&\quad (V_7)(E_{1,7,D_7}) + (V_8)(E_{1,8,D_8}) + (V_9)(E_{1,9,D_9}) + \\
&\quad (V_{10})(E_{1,10,D_{10}}) + (V_{11})(E_{1,11,D_{11}}) + (V_{12})(E_{1,12,D_{12}}) + \\
&\quad (V_{13})(E_{1,13,D_{13}}) + (V_{14})(E_{1,14,D_{14}}) + (V_{15})(E_{1,15,D_{15}}) \\
&= (0)(E_{1,1,20}) + (0)(E_{1,2,50}) + (25)(E_{1,3,75}) + \\
&\quad (0)(E_{1,4,10}) + (30)(E_{1,5,50}) + (0)(E_{1,6,20}) + \\
&\quad (0)(E_{1,7,20}) + (0)(E_{1,8,10}) + (0)(E_{1,9,10}) + \\
&\quad (0)(E_{1,10,10}) + (10)(E_{1,11,20}) + (0)(E_{1,12,10}) + \\
&\quad (0)(E_{1,13,10}) + (0)(E_{1,14,10}) + (10)(E_{1,15,10}) \\
&= (25)(E_{1,3,75}) + (30)(E_{1,5,50}) + (10)(E_{1,11,20}) + \\
&\quad (10)(E_{1,15,10})
\end{aligned}$$

Coefficient $E_{ijm}$ is selected from a preselected table of values. The matrix $E_{ijm}$ may be a matrix having 4 by 15 by 100 coefficients or values, where m is an integer from 1 through 100. In this case, $E_{1,3,75}$ is the coefficient in the three dimensional matrix located in the first row, third column, seventy-fifth level of the matrix, and so on. It is not necessary to have individual levels m for each of the $D_j$ possible levels. In other words, it is not necessary to have a set of $E_{ij}$ coefficients for each m varying from 1 through 100, thus having a 4 by 15 by 100 matrix $E_{ijm}$. Either a matrix $E_{ijm}$ with less than 100 levels, e.g., 20 levels may be used, in which case the 100 possible m values can be grouped into groups of 5 for which the same level is used. This method can be referred to as rounding up or down to the closest available m value. Alternatively, an interpolation may be used in calculating the applicable $E_{ijm}$ coefficient value using the available coefficients for m values. An extrapolation beyond known $E_{ijm}$ coefficient values may also be performed.

Referring back to the example illustrated in this disclosure, assume that the desired $E_{ijm}$ coefficients are selected from a matrix $E_{ijm}$ having 4 by 15 by 100 coefficients (or from a matrix $E_{ijn}$ having 4 by 15 by m coefficients, where m is less than 100 and the desired $E_{ijm}$ coefficients are interpolated or extrapolated from, or rounded up or down to, values in the preexisting matrix $E_{ijm}$). For instance, assume that the values for $E_{1,3,75}$, $E_{1,5,50}$, $E_{1,11,20}$, and $E_{1,15,10}$ are:

$$\begin{aligned}
E_{1,3,75} &= 0.10, \\
E_{1,5,50} &= -0.05, \\
E_{1,11,20} &= 0.80 \text{ and} \\
E_{1,15,10} &= 0.95.
\end{aligned}$$

Using these values, we can continue the illustrated example by calculating $F_1$ as follows:

$$\begin{aligned}
F_1 = F_C &= (25)(E_{1,3,75}) + (30)(E_{1,5,50}) + (10)(E_{1,11,20}) + \\
&\quad (10)(E_{1,15,10}) \\
&= (25)(0.10) + (30)(-0.05) + (10)(0.80) + (10)(0.95) \\
&= 2.5 - 1.5 + 8 + 9.5 = 18.5 \text{ or } 19 \text{ after rounding up.}
\end{aligned}$$

The calculated corrected set of n color separation values, $F_i = \{F_1, F_2, F_3, F_4\}$, for each pixel is used instead of, or to replace, the original values, i.e., $\{C_o, M_o, Y_o, K_o\}$, to control a color output device to produce a faithful color reproduction of the image. In our calculated example, the original value $C_o$ (which is 20) is, thus, replaced by the corrected value of $F_c$ which is 19.

The matrix $E_{ijm}$ of preselected color coefficients can be preselected or predetermined by the following steps where the first set of colors comprise cyan, magenta, yellow and black.

Figure 6:
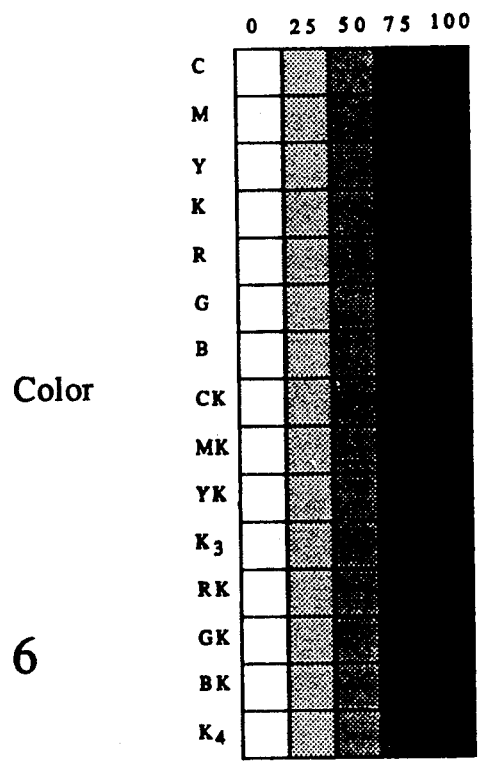
FIG. 6 is a schematic illustration of a sample test pattern.

Step (a): A test pattern image is generated electronically on a computer system or color electronic prepress system (CEPS). This electronic test pattern contains, at a minimum, the following fifteen colors or color combinations: cyan (C), magenta (M), yellow (Y), black (K), magenta-yellow (also known as red) (R), cyan-yellow (also known as green) (G), cyan-magenta (also known as blue) (B), cyan-black (CK), magenta-black (MK), yellow-black (YK), cyan-magenta-yellow (also know as three-color black) ($K_3$), magenta-yellow-black (also known as red-black) (RK), cyan-yellow-black (also known as green-black) (GK), cyan-magenta-black (also known as blue-black) (BK), and cyan-magenta-yellow-black (also known as four-color black) ($K_4$). Each of these described fifteen colors contain equal amounts of the corresponding components of cyan, magenta, yellow, and/or black. Each of the colors is represented at multiple known gradation levels. Generally speaking, larger numbers of gradation levels allow better calibration, and thus, better color correction. Each area of a unique hue should be large enough that, when printed, it can be measured by a color measuring device such as a spectrophotometer or chroma meter. A sample test pattern may look like FIG. 6, except instead of showing different shades of gray for the gradation levels for each color, it would have different shades of each of the colors for the gradation levels. For instance, the area or block in the first or C row and the second or 25% column would be a shade of cyan that is 25% lighter than the shade of cyan in the area or block in the first or C row and the third or 50% column, etc.

Step (b): The electronic test pattern image is printed using the apparatus and/or process that the user desires to match. This creates a first printed reference test pattern image or print. This could be done with an actual printing press or any other printing or proofing process.

Step (c): The hues of the first printed reference test pattern image are measured using a spectrophotometer, chroma meter, or other color measuring device. This measured data is used as reference data to be matched with the color correction process of the present invention.

Step (d): The electronic test pattern image is printed using the printing or proofing process which is desired to match the printing or proofing process used to create the printed reference test pattern image. This creates a second printed test pattern image or print.

Step (e): The second print's hues are then measured with a spectrophotometer, chroma meter, or other color measuring device. Steps (d and e) can be performed before, during or after steps (b and c).

Step (f): These measurements of the second print's hues are then compared to the reference data on the first print's hues gathered in step (c). Any differences between the measured second print's hues and the reference data are used to modify the coefficients in a unity matrix in a manner to improve the color accuracy of the process.

For example, if it is found that the green hue at the 50% gradation level contains too much cyan, the corresponding coefficient in the unity matrix is decreased. The modified unity matrix can then be used to reprocess the original image to result in less cyan being present in the green hue at the 50% gradation level.

The "unity matrix" may have been created beforehand or can be created as part of this step. As used herein, the "unity matrix" is the matrix that, when used as the matrix $E_{ijm}$ in the present invention, will result in output values $F_i$ equal to the input values, i.e., $\{C_o, M_o, Y_o, K_o\}$, passed to the process. In other words, no color correction has effectively taken place. The "unity matrix" for this case which is a "4×15" process looks as follows.

|   | C | M | Y | K | B | A | G | CK | MK | YK | $K_3$ | BK | AK | GK | $K_4$ |
|---|---|---|---|---|---|---|---|---|---|---|---|---|---|---|---|
| C | 1.00 | 0.00 | 0.00 | 0.00 | 0.00 | 1.00 | 1.00 | 1.00 | 0.00 | 0.00 | 1.00 | 0.00 | 1.00 | 1.00 | 1.00 |
| M | 0.00 | 1.00 | 0.00 | 0.00 | 1.00 | 0.00 | 1.00 | 1.00 | 1.00 | 0.00 | 1.00 | 1.00 | 0.00 | 1.00 | 1.00 |
| Y | 0.00 | 0.00 | 1.00 | 0.00 | 1.00 | 1.00 | 0.00 | 1.00 | 0.00 | 1.00 | 1.00 | 1.00 | 1.00 | 0.00 | 1.00 |
| K | 0.00 | 0.00 | 0.00 | 1.00 | 0.00 | 0.00 | 0.00 | 0.00 | 1.00 | 1.00 | 1.00 | 1.00 | 1.00 | 1.00 | 1.00 |

This 4×15 unity matrix is repeated "m" times where the color correction coefficient matrix is 4 by 15 by m. Each mth level corresponds to the correction coefficients for a given gradation level. For the original color correction coefficient unity matrix, all levels are the same 4×15 matrix.

Step (g): The electronic reference test pattern image is processed with the "4×15" color correction process of the present invention using the modified unity matrix as the matrix $E_{ijm}$. This means that the matrix V and the matrix D are generated in accordance with the first step of the present invention from the original color separation image density values generated in step (a) in generating the electronic test pattern image. Then the corrected set of 4 color separation values, $F_i=\{F_1, F_2, F_3, F_4\}$, for each pixel or uniform area, are calculated in accordance with the second step of the present invention using the generated matrixes V and D and the modified unity matrix of step (f) as the matrix $E_{ijm}$.

Step (h): The color corrected test pattern image is then printed using the printing or proofing process which is desired to match the printing or proofing process used to create the printed reference test pattern image.

Step (i): The new or color corrected print's hues are then measured with a spectrophotometer, chroma meter, or other color measuring device.

Step (j): These measurements of the new or color corrected print's hues are then compared to the reference data gathered in step (c). Any differences between the new print's hues and the reference data are used to modify the coefficients in the modified unity matrix created in step (f) in a manner to improve the color accuracy of the process.

Step (h): Steps (g) through (j) are repeated using the most recently modified matrix as the matrix $E_{ijm}$ in step (g) until the color differences between the first reference print and the most recent color corrected print are reduced to a minimum or predetermined level.

Further, the matrix $E_{ijm}$ of preselected color coefficients can be preselected utilizing an appropriately trained parallel processing network, otherwise referred to as a neural network. For instance, steps (d, e, h and i) can be replaced with a neural network algorithm which (after being taught) can predict the color output from given inputs without ever actually creating a print.

The following is a set of coefficients from a matrix $E_{ijm}$ which have been found to perform well with the DuPont 4CAST ® Digital Color Imager. The numbers in the first column are the gradation levels m. In this case m=4. In the 4CAST ® case, these are numbers which range from 0 to 255. The given numbers correspond to 25, 50, 75, and 100% saturation.

| m | j=1 C | j=2 M | j=3 Y | j=4 K | j=5 B | j=6 A | j=7 G | j=8 CK | j=9 MK | j=10 YK | j=11 $K_3$ | j=12 BK | j=13 AK | j=14 GK | j=15 $K_4$ | i |
|---|---|---|---|---|---|---|---|---|---|---|---|---|---|---|---|---|
| 1 | 0.80 | 0.00 | 0.00 | 0.00 | 0.00 | 0.92 | 0.94 | 1.09 | 0.00 | 0.00 | 1.00 | 0.00 | 1.02 | 0.98 | 1.02 | 1 |
|   | 0.00 | 0.77 | 0.00 | 0.00 | 0.70 | 0.00 | 0.94 | 0.00 | 1.05 | 0.00 | 0.95 | 1.00 | 0.00 | 1.00 | 1.00 | 2 |
|   | 0.00 | 0.00 | 1.08 | 0.00 | 1.02 | 0.92 | 0.05 | 0.03 | 0.16 | 1.19 | 1.09 | 1.25 | 1.12 | 0.00 | 1.23 | 3 |
|   | 0.00 | 0.00 | 0.00 | 1.09 | 0.00 | 0.00 | 0.09 | 1.20 | 1.09 | 0.97 | 0.00 | 1.00 | 1.09 | 1.23 | 1.09 | 4 |
| 2 | 0.82 | 0.00 | 0.00 | 0.00 | 0.00 | 0.86 | 0.88 | 1.00 | −0.04 | 0.00 | 0.98 | 0.00 | 1.00 | 0.90 | 0.98 | 1 |
|   | 0.00 | 0.80 | 0.00 | 0.04 | 0.75 | 0.00 | 0.88 | 0.00 | 0.94 | 0.00 | 0.88 | 0.78 | 0.00 | 0.90 | 0.88 | 2 |
|   | 0.00 | 0.00 | 1.14 | 0.16 | 1.01 | 1.00 | 0.00 | 0.00 | 0.06 | 1.11 | 1.05 | 1.17 | 1.18 | 0.00 | 1.20 | 3 |
|   | 0.00 | 0.00 | 0.00 | 1.00 | 0.00 | 0.00 | 0.14 | 1.16 | 1.05 | 0.91 | 0.00 | 1.01 | 1.00 | 1.13 | 1.00 | 4 |
| 3 | 0.78 | 0.00 | 0.00 | 0.00 | 0.00 | 0.81 | 0.78 | 0.99 | 0.00 | 0.00 | 0.95 | 0.00 | 0.96 | 0.78 | 0.95 | 1 |
|   | 0.00 | 0.79 | 0.00 | 0.00 | 0.79 | 0.00 | 0.76 | 0.00 | 0.86 | 0.00 | 0.82 | 0.78 | 0.00 | 0.78 | 0.89 | 2 |
|   | 0.00 | 0.00 | 1.30 | 0.15 | 1.00 | 1.00 | 0.00 | 0.00 | 0.00 | 1.25 | 1.01 | 1.06 | 1.15 | 0.02 | 1.03 | 3 |
|   | 0.00 | 0.00 | 0.00 | 1.04 | 0.00 | 0.00 | 0.13 | 1.12 | 1.07 | 0.94 | 0.00 | 1.00 | 0.98 | 1.15 | 1.00 | 4 |
| 4 | 0.73 | 0.00 | 0.00 | 0.01 | 0.00 | 0.74 | 0.78 | 1.00 | 0.00 | 0.00 | 0.86 | 0.00 | 0.96 | 0.96 | 0.97 | 1 |
|   | 0.00 | 0.74 | 0.00 | 0.02 | 0.82 | 0.00 | 0.75 | 0.04 | 0.82 | −0.02 | 0.75 | 0.80 | 0.00 | 0.88 | 0.86 | 2 |
|   | 0.02 | 0.00 | 1.00 | 0.13 | 1.00 | 1.00 | 0.00 | 0.05 | 0.00 | 1.00 | 1.00 | 1.00 | 1.04 | 0.02 | 1.00 | 3 |
|   | 0.00 | 0.00 | 0.00 | 1.00 | 0.00 | 0.00 | 0.05 | 1.00 | 1.00 | 0.95 | 0.00 | 1.00 | 1.00 | 1.00 | 1.00 | 4 |

Another case of the first embodiment of the present invention is where n=3 and the first set of colors comprise cyan (C), magenta (M) and yellow (Y). In this case, the matrix $V_j$ of intermediate values are generated using the following equations:

| | |
|---|---|
| $V_7 = \min(C_o, M_o, Y_o)$ | (Value for CMY), |
| $V_6 = \min(C_o, M_o) - V_7$ | (Value for CM), |
| $V_5 = \min(C_o, Y_o) - V_7$ | (Value for CY), |
| $V_4 = \min(M_o, Y_o) - V_7$ | (Value for MY), |
| $V_3 = Y_o - V_4 - V_5 - V_7$ | (Value for Y), |
| $V_2 = M_o - V_4 - V_6 - V_7$ | (Value for M), and |
| $V_1 = C_o - V_5 - V_6 - V_7$ | (Value for C). |

Further, in this case the matrix $D_j$ of index values are generated using the following equations:

| | |
|---|---|
| $D_7 = \min(C_o, M_o, Y_o)$ | (Index for CMY), |
| $D_6 = \min(C_o, M_o)$ | (Index for CM), |
| $D_5 = \min(C_o, Y_o)$ | (Index for CY), |
| $D_4 = \min(M_o, Y_o)$ | (Index for MY), |
| $D_3 = Y_o$ | (Index for Y), |
| $D_2 = M_o$ | (Index for M), and |
| $D_1 = C_o$ | (Index for C). |

In this case, the matrix $E_{ijm}$ is a three dimensional matrix which consists of 3 rows i and 7 columns j of predetermined or preselected color coefficients for each of m gradation levels where m is a number of distinct gradation levels for which there is a set of $E_{ij}$ coefficients. This matrix $E_{ijm}$ of preselected color coefficients can be preselected or predetermined by the steps previously described, except the unity matrix is a 3 by 7 by m matrix.

Referring back to FIG. 1, the $C_o$, $M_o$, $Y_o$, and $K_o$ values can be inputted into a computer or digital signal processor 18 for performing the steps of the present invention. The computer or processor output 21 may be used to control a color output device 24, such as a printer to produce hardcopy output 25. The printer 24 may be a laser printer able to expose photographic film or, preferably, a thermal printer able to produce multicolored images, such as the 4CAST® digital color imager sold by E. I. du Pont de Nemours and Company with offices at Wilmington, Delaware. Such a printer utilizes a multicolored band containing sublimable dyes and thermal printing head to create an image in response to an electronic color separation input. The computer 18 may be a general purpose personal computer with appropriate image processing software to implement the present invention, or may be a dedicated computer which may also include other signal processing functions, such as sharpening filters, halftoning software, etc. These functions are of no particular interest in the implementation of this invention and may operate on the color signal after it has been corrected in accordance with this invention in a similar fashion as they would have in the absence of any color correction.

The computer output may also be directed through an optional path 19 to an interactive display-workstation 22 where further image processing may occur prior to outputting a signal 23 for driving the printer 24.

In implementing the process of the present invention, it is preferred to use a computer to perform the various calculations needed to modify each color separation value for each pixel. The program may also contain the appropriate coefficient values for $E_{ijm}$. An illustrative software embodiment for performing the method of the present invention is included in an Appendix A to this specification. In this appended software embodiment of the present invention, the number of gradation levels m is 64; n=4; the first set of colors comprise cyan, magenta, yellow and black; i, thus, ranges from 1 through 4; and j ranges from 1 through 15. This software program is written in assembly language for the AT&T DSP32C Digital Signal Processor and appears immediately before the claims.

A second embodiment of the present invention has been created for the case where the number of original color separation image density values corresponds to a first set of n =4 colors, where the colors are cyan, magenta, yellow, and black. This second adaptation allows a less computationally expensive color correction.

The second embodiment differs from the first embodiment in the fact that the second embodiment is treated as if n=3 and corresponds to cyan, magenta, and yellow, thus creating 7 intermediate colors (and associated intermediate color values), and an eighth intermediate color (and associated color value) is added corresponding to black. Thus, a four color to four color transformation is maintained, but only 8 intermediate color values are created, instead of the 15 intermediate color values in the first embodiment, reducing the number of required calculations. This case does not allow independent adjustment of those color combinations which include black, as does the invention as previously described, but may be a suitable compromise for users who lack the required computational power.

This second adaptation or embodiment relates to a method for processing original color separation image density values of pixels of an original image, the number of the original values corresponding to a first set of 4 colors, comprising:

generating, for each pixel, two matrixes, a 1 by 8 matrix V of intermediate color values relating to the original values for the first set of n colors, and a 1 by 8 matrix D of color indexes also relating to the original values for the first set of 4 colors, and calculating, for each pixel, a corrected set of 4 color separation values, $F_i = \{F_1, F_2, F_3, F_4\}$, utilizing the generated matrix $V_j$ of intermediate color values, the generated matrix $D_j$ of color indexes, and coefficients $E_{ijD_j}$ selected from a three dimensional matrix $E_{ijm}$ of preselected color coefficients utilizing the equation:

$$F_i = \sum_{j=1}^{8} (V_j)(E_{ijD_j}).$$

The first step of this second embodiment is generating, for each pixel, a 1 by 8 matrix $D_j$ of color indexes and a 1 by 8 matrix $V_j$ of intermediate color values, both relating to the original values of the first set of 4 colors.

The matrix $V_j$ of intermediate color values is comprised of 8 values each equal to the amount of the intermediate colors found in the first set of 4 colors. The 8 intermediate colors correspond to every possible combination of 1 or more of the 3 colors, e.g., cyan, magenta, and yellow, plus an eighth intermediate color, black. Specifically these combinations would be: C, M, Y, K, MY, CM, CY, and CMY.

The 8 values for matrix $V_j$ are found by first finding the amount of the intermediate color which contains all 3 original colors, cyan, magenta and yellow. This can be done by finding the minimum value of those 3 original values of the first set of 4 colors. Secondly, the intermediate colors comprised of combinations of 2 of the noted 3 colors are found by finding the minimum value of the 2 colors in the combination and subtracting the value of the 3 combination intermediate color found in the first step. For the last case, the remaining value is found for either cyan, magenta, or yellow, and the contribution of the corresponding non-zero 2 color intermediate color and the 3 color intermediate color are subtracted. The resulting matrix $V_j$ will contain no more than 4 non-zero values.

For example, consider again the case where n=4 and the first set of colors is composed of cyan, magenta, yellow and black where $C_o=20$, $M_o=50$, $Y_o=75$, and $K_o=10$. This as noted before is illustrated in FIG. 2.

Figure 7:
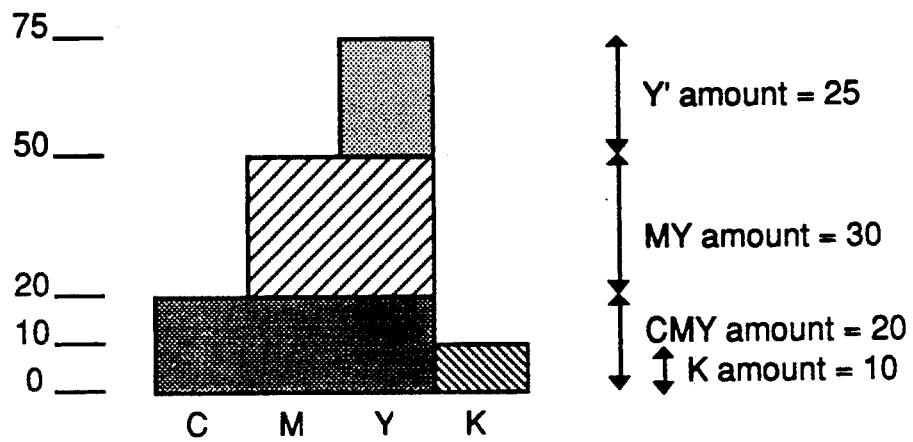
FIG. 7 is a graph illustrating the meaning of "intermediate color values" in a specific case as used in this disclosure.

When viewed as combinations of one or more of the cyan, magenta and yellow colors, it looks as shown in FIG. 7. FIG. 7 depicts the intermediate color values for the intermediate colors Y', MY, CMY and CMYK to be 25, 30, 20 and 10, respectfully.

CMY is the intermediate color comprised of 3 original colors, cyan, magenta, and yellow. Its value is obtained by finding the minimum value of $C_o$, $M_o$, and $Y_o$. The non-zero intermediate color comprised of a combination of 2 of the colors cyan, magenta, and yellow, is, in this case, MY. It is obtained by finding the minimum value of $M_o$ and $Y_o$ and subtracting out the CMY contribution already accounted for. The non-zero intermediate color comprised of only one of the original cyan, magenta, or yellow colors is, in this case, Y'. It is obtained by taking the value of $Y_o$ and subtracting out the MY, CMY contributions already accounted for. Lastly, the $K_o$ value is for the intermediate value for black. All other values in the V matrix of intermediate colors are zero.

Thus, for the case where n=4 and the first set of colors is composed of cyan (C), magenta (M), yellow (Y), and black (K) and where the matrix V is a 1 by 8 matrix, the V matrix is found as follows:

| | |
|---|---|
| $V_8 = \min(C_o, M_o, Y_o)$ | (Value for CMY) |
| $V_7 = \min(C_o, M_o) - V_8$ | (Value for CM) |
| $V_6 = \min(C_o, Y_o) - V_8$ | (Value for CY) |
| $V_5 = \min(M_o, Y_o) - V_8$ | (Value for MY) |
| $V_4 = K_o$ | (Value for K) |
| $V_3 = Y_o - V_5 - V_6 - V_8$ | (Value for Y) |
| $V_2 = M_o - V_5 - V_7 - V_8$ | (Value for M) |
| $V_1 = C_o - V_6 - V_7 - V_8$ | (Value for C) | where min (x, y) denotes a function which returns the minimum value of x or y.

The matrix $D_j$ of color indexes is comprised of values equal to the maximum value of the intermediate colors found in the previous step. The values can be found at the same time the V matrix values are found. Only the 4 index values corresponding to the non-zero intermediate color values are significant; the others can be set to zero or ignored, since they have no contribution to the output colors.

Thus, for the case where n=4, the first set of colors is composed of cyan (C), magenta (M), yellow (Y), and black (K), and the matrix D is a 1 by 8 matrix, then the matrix D is found as follows:

| | |
|---|---|
| $D_8 = \min(C_o, M_o, Y_o)$ | (Index for CMY), |
| $D_7 = \min(C_o, M_o)$ | (Index for CM), |
| $D_6 = \min(C_o, Y_o)$ | (Index for CY), |
| $D_5 = \min(M_o, Y_o)$ | (Index for MY), |
| $D_4 = K_o$ | (Index for K), |
| $D_3 = Y_o$ | (Index for Y), |
| $D_2 = M_o$ | (Index for M), and |
| $D_1 = C_o$ | (Index for C). |

Figure 8:
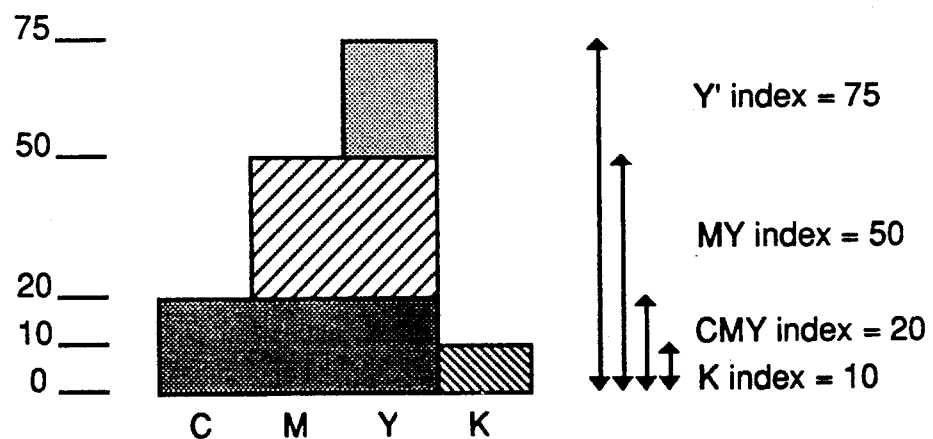
FIG. 8 is a graph illustrating the meaning of "color indexes" in a specific case as used in this disclosure.

For example, consider the same example previously discussed where n=4 and the first set of colors is composed of values for cyan, magenta, yellow, and black where $C_o=20$, $M_o=50$, $Y_o=75$, and $K_o=10$. For this example, FIG. 8 depicts the index values for the intermediate colors Y', MY, CMY and CMYK as being 75, 50, 20 and 10, respectively.

The second step of this second embodiment of the invention is calculating, for each pixel, a corrected set of 4 color separation values, $F_i = \{F_1, F_2, F_3, F_4\}$, utilizing the generated matrix $V_j$ of intermediate color values, the generated matrix $D_j$ of color indexes, and coefficients $E_{ijDj}$ selected from a three dimensional matrix $E_{ijm}$ of preselected color coefficients utilizing the equation:

$$F_i = \sum_{j=1}^{8} (V_j)(E_{ijDj}).$$

The matrix $E_{ijm}$ is a three dimensional matrix which consists of 4 rows i and 8 columns j of predetermined or preselected color coefficients for each of m gradation levels where m is a number of distinct gradation levels for which there is a set of $E_{ij}$ coefficients.

The corrected set of four color separation values, $F_i = \{F_1, F_2, F_3, F_4\}$, for the example original values previously provided can, thus, be calculated using the following equation:

$$F_i = \sum_{j=1}^{8} (V_j)(E_{ijDj}).$$

Using the original values for the present example, we calculate $F_1$ as follows:

$$\begin{aligned}F_1 = F_C &= (V_1)(E_{1,1,D1}) + (V_2)(E_{1,2,D2}) + (V_3)(E_{1,3,D3}) + \\ &\quad (V_4)(E_{1,4,D4}) + (V_5)(E_{1,5,D5}) + (V_6)(E_{1,6,D6}) + \\ &\quad (V_7)(E_{1,7,D7}) + (V_8)(E_{1,8,D8}) \\ &= (0)(E_{1,1,20}) + (0)(E_{1,2,50}) + (25)(E_{1,3,75}) + \\ &\quad (10)(E_{1,4,10}) + (30)(E_{1,5,50}) + (0)(E_{1,6,20}) + \\ &\quad (0)(E_{1,7,20}) + (20)(E_{1,8,20}) \\ &= (25)(E_{1,3,75}) + (10)(E_{1,4,10}) + (30)(E_{1,5,50}) + \\ &\quad (20)(E_{1,8,20})\end{aligned}$$

In this second embodiment, $E_{ijm}$ is selected from a preselected table of values as in the first embodiment. In this second embodiment, however, the matrix $E_{ijm}$ consists of four rows i and eight columns j for each of the m gradation levels.

Referring back to the example illustrated in this disclosure, assume that the desired $E_{ijm}$ coefficients are selected from a matrix $E_{ijm}$ having 4 by 8 by 100 coefficients (Or from a matrix $E_{ijm}$ having 4 by 8 by m coefficients, where m is less than 100 and the desired $E_{ijm}$ coefficients are interpolated or extrapolated from, or rounded up or down to, values in the preexisting matrix $E_{ijm}$). For instance, assume that the values for $E_{1,3,75}$, $E_{1,4,10}$, $E_{1,5,50}$, and $E_{1,8,20}$ are:

$$\begin{aligned}E_{1,3,75} &= 0.05, \\ E_{1,4,10} &= -0.10, \\ E_{1,5,50} &= 0.95 \text{ and} \\ E_{1,8,20} &= 0.10.\end{aligned}$$

Using these values, we can continue the illustrated example by calculating $F_1$ as follows:

$$\begin{aligned}F_1 = F_C &= (25)(E_{1,3,75}) + (30)(E_{1,4,10}) + (20)(E_{1,5,50}) + \\ &\quad (10)(E_{1,8,20}) \\ &= (25)(0.05) + (30)(-0.10) + (20)(0.85) + (10)(0.10) \\ &= 1.25 - 3.0 + 19 + 1 = 18.25 \text{ or 18 after rounding} \\ &\quad \text{down.}\end{aligned}$$

Again, the calculated corrected set of 4 color separation values, $F_i = \{F_1, F_2, F_3, F_4\}$, for each pixel is used instead of, or to replace, the original values, i.e., [$C_o$, $M_o$, $Y_o$, $K_o$], to control a color output device to produce a faithful color reproduction of the image. In our calculated example with the modified algorithm, the original value $C_o$ (which is 20) is, thus, replaced by the corrected value of $F_C$ which is 18.

The matrix $E_{ijm}$ of preselected color coefficients can be preselected or predetermined by the steps previously described in relation to the first embodiment, except the steps of the color correction process of the second embodiment are used instead of the steps of the color correction process of the first embodiment. Further, in the second embodiment, the unity matrix is a 4 by 8 by m matrix.

The following is set of coefficients from a matrix $E_{ijm}$ which have been found to perform well with the DuPont 4CAST ®Digital Color Imager. The numbers in the first column are the gradation levels m. In this case m=4. In this case the gradation levels range from 0 through 255. Four gradation levels m are provided which correspond to 25%, 50%, 75% and 100% saturation.

| m | i | j=1 C | j=2 M | j=3 Y | j=4 K | j=5 MY | j=6 CM | j=7 CY | j=8 CMY |
|---|---|---|---|---|---|---|---|---|---|
| 1 | 1 | 0.47 | 0.14 | 0.00 | 0.00 | 0.02 | 0.61 | 0.71 | 0.85 |
| 1 | 2 | 0.23 | 0.68 | 0.08 | 0.00 | 0.59 | 0.04 | 0.85 | 1.03 |
| 1 | 3 | 0.04 | 0.35 | 0.52 | 0.00 | 0.79 | 0.62 | 0.35 | 1.19 |
| 1 | 4 | 0.00 | 0.00 | 0.00 | 1.16 | 0.00 | 0.00 | 0.00 | 0.00 |
| 2 | 1 | 0.58 | 0.09 | 0.00 | 0.00 | 0.02 | 0.61 | 0.71 | 0.80 |
| 2 | 2 | 0.08 | 0.75 | 0.05 | 0.00 | 0.63 | 0.03 | 0.82 | 0.97 |
| 2 | 3 | 0.05 | 0.28 | 0.57 | 0.00 | 0.75 | 0.71 | 0.30 | 1.09 |
| 2 | 4 | 0.00 | 0.00 | 0.00 | 1.07 | 0.00 | 0.00 | 0.00 | 0.00 |
| 3 | 1 | 0.71 | 0.05 | 0.00 | 0.00 | 0.02 | 0.66 | 0.74 | 0.80 |
| 3 | 2 | −0.01 | 0.86 | 0.05 | 0.00 | 0.72 | 0.02 | 0.84 | 0.94 |
| 3 | 3 | 0.05 | 0.19 | 0.69 | 0.00 | 0.76 | 0.85 | 0.23 | 1.04 |
| 3 | 4 | 0.00 | 0.00 | 0.00 | 1.05 | 0.00 | 0.00 | 0.00 | 0.00 |
| 4 | 1 | 0.85 | 0.02 | 0.00 | 0.10 | 0.02 | 0.72 | 0.78 | 0.80 |
| 4 | 2 | −0.04 | 0.98 | 0.04 | 0.10 | 0.83 | 0.00 | 0.88 | 0.90 |
| 4 | 3 | 0.05 | 0.09 | 0.82 | 0.10 | 0.79 | 1.00 | 0.16 | 1.00 |
| 4 | 4 | 0.00 | 0.00 | 0.00 | 1.00 | 0.00 | 0.00 | 0.00 | 0.06 |

An illustrative software embodiment for performing the second embodiment of the present invention is included in an Appendix B to this specification. In the appended software embodiment of the present invention, the number of gradation levels m is 128. The software program is written in the assembly language for the AT&T DSP32C digital signal processor and appears immediately before the claims.

Those skilled in the art, having the benefit of the teachings of the present invention as hereinabove set forth, can effect numerous modifications thereto. These modifications are to be construed as being encompassed within the scope of the present invention as set forth in the appended claims.

Appendix A

```
/********************************************************************/
/*                                                                  */
/* Property of E. I. duPont de Nemours & Company, Wilmington, DE    */
/*                                                                  */
/*                                                                  */
/* This software is proprietary. The program source, listing, binary*/
/* and executable files are duPont Company property and may not be  */
/* distributed or copied for non-duPont use without the expressed   */
/* written approval of company management.                          */
/*                                                                  */
/* Copyright 1989, 1990  E.I. du Pont de Nemours & Co.              */
/*                                                                  */
/********************************************************************/

/********************************************************************/
/*                                                                  */
/* FILE:    4x15.S -- 4CAST COLOR CONVERSION PROGRAM FOR DSP32      */
/*                                                                  */
/* PURPOSE: Routines for color conversion with DSP32 hardware.      */
/*                                                                  */
/* AUTHOR:  George T. Warner                                        */
/*                                                                  */
/* NOTES:                                                           */
/*      Program starts at address 0 and waits for nonzero data to be*/
/*      written to the Startflag address.                           */
/*      Variables at address 0x0A00 of RAM must be initialized      */
/*      before setting the Startflag.                               */
/*      The results are stored back to the location of the input    */
/*      data.                                                       */
/*      Program completes by setting the PIF and writing to the     */
/*      Doneflag address.                                           */
/*                                                                  */
/* REVISIONS:                                                       */
/*   02/03/90  Fixed bug which occurred when C>Y>K>M and C>K>Y>M.   */
/*   02/01/90  Fixed bug which cause data where C>M to output       */
/*             incorrectly.                                         */
/*   12/29/89  First version adapted from colcor25.s.               */
/*                                                                  */
/********************************************************************/
```

```
/*******************************************************************/
/*                                                                 */
/* Memory Map:   0x0000-0x07ff  Program code                       */
/*               0x0800-0x09ff  Variables & Table                  */
/*               0x0A00-0x0fff  Variables set by host              */
/*               0x1000-0x1fff  Line 0, color 0 data               */
/*               0x2000-0x2fff  Line 0, color 1 data               */
/*               0x3000-0x3fff  Line 0, color 2 data               */
/*               0x4000-0x4fff  Line 0, color 3 data               */
/*               0x5000-0x8fff  Correction matrices in             */
/*               C,M,Y,K,R,G,B,CK,MK,YK,3,RK,GK,BK,3K format.      */
/*               0x9000-0x9fff  Line 1, color 0 data               */
/*               0xa000-0xafff  Line 1, color 1 data               */
/*               0xb000-0xbfff  Line 1, color 2 data               */
/*               0xc000-0xcfff  Line 1, color 3 data               */
/*                                                                 */
/*******************************************************************/ define TITLE "4Cast DSP32 4x15 Color Correction Program"
define VERSION_DSP32_4x15 "Version 1.00a, 02/03/90"

.rsect ".bank0"

.global Points, Inv_data, Indata1, Indata2, Indata3, Indata4
.global Start, Noinv, T_done, Getdata, Startflag, Wait_for_go
.global Datahere, Ok1, Ok2, Ok3, Ok4, Complete /* Matrix coefficient offsets. */
define C_OFFSET        0
#define M_OFFSET        4
#define Y_OFFSET        8
#define K_OFFSET        12
#define R_OFFSET        16
#define G_OFFSET        20
#define B_OFFSET        24
#define CK_OFFSET       28
#define MK_OFFSET       32
#define YK_OFFSET       36
#define T_OFFSET        40
#define RK_OFFSET       44
#define GK_OFFSET       48
#define BK_OFFSET       52
#define TK_OFFSET       56

/* Register and accumulator definitions */
#define cpointer r1      /* Cyan pointer. */
#define mpointer r2      /* Magenta pointer. */
#define ypointer r3      /* Yellow pointer. */
#define kpointer r4      /* Black pointer. */
#define wpointer r5      /* Work pointer. */
#define wpointer2 r6     /* Magenta work pointer. */
#define pri_offset r7    /* Primary color offset. */
#define sec_offset r8    /* Secondary color offset. */
#define cdata r9         /* Cyan data. */
#define mdata r10        /* Magenta data. */
#define ydata r11        /* Yellow data. */
#define kdata r12        /* Black data. */
#define cdatal r91       /* Cyan data, low byte. */
#define mdatal r101      /* Magenta data, low byte. */
#define ydatal r111      /* Yellow data, low byte. */
#define kdatal r121      /* Black data, low byte. */
#define treg r13         /* Temporary register. */
#define flpoint r14      /* Temporary pointer to a float. */
#define counter r15      /* Pixel counter. */
#define ter_offset  r16  /* Tertiary color offset and Overflow data register. */
#define inc_reg r17      /* Increment register. */
#define cval a0          /* Cyan accumulator. */
#define mval a1          /* Magenta accumulator. */
```

```
        #define yval a2          /* Yellow accumulator. */
        #define kval a3          /* Black accumulator. */ define Table_base 0x5000 /* Start of coefficient table. */

Start: treg = 0
            pcw = treg            /* This command for the DSP32C. */
            *Startflag = treg     /* Clear startflag. */
            *Doneflag = treg      /* Clear doneflag. */

Wait_for_go: treg = 0
    Wait1:  counter = *Startflag
            nop
            if (eq) goto Wait1    /* Wait for Startflag to be set. */
            nop
            *Startflag = treg     /* Clear Startflag. */
            *Doneflag = treg      /* Clear Doneflag. */ counter = *Points     /* Get number of points to do. */ cpointer = *Indata1   /* Set pointers to input data. */
            counter = counter-1   /* Decrement by one. */
            mpointer = *Indata2
            ypointer = *Indata3
            kpointer = *Indata4
            wpointer = Ocolors    /* Set floating point data pointers. */
            wpointer2 = Ocolors
            flpoint = Zero
            treg = Dpoint Getdata: *treg++ = cpointer   /* Save pointers for later. */
            *treg++ = mpointer
            *treg++ = ypointer
            *treg++ = kpointer
            cdata1 = *cpointer    /* Read a byte. */
            mdata1 = *mpointer
            ydata1 = *ypointer
            kdata1 = *kpointer treg = *Inv_data      /* Test inverted data flag. */
            nop
            if(eq) goto Noinv     /* Go on if data not inverted. */
            inc_reg=4
            cdata = cdata ^ 0xff  /* Invert data. */
            mdata = mdata ^ 0xff
            ydata = ydata ^ 0xff
            kdata = kdata ^ 0xff Noinv: *wpointer++inc_reg = cdata   /* Copy data to memory. */
            *wpointer++inc_reg = mdata
            *wpointer++inc_reg = ydata
            *wpointer = kdata inc_reg = 8

/* Convert ints to floats. */
    Convert: *wpointer-- = kval = float(*wpointer)
            *wpointer2++ = cval = float(*wpointer2)
            *wpointer-- = yval = float(*wpointer)
            *wpointer2-- = mval = float(*wpointer2)

/* Set pointer for amounts. */
            cpointer = Colors
            /* Set pointer for indexes. */
            mpointer = Indexes
```

```
          /* Now we need to find out the order of the data. */
          cdata - mdata
          if(ls) goto CLM cdata - ydata
   CBM:   if(ls) goto CLY0 /* C>M */ cdata - kdata
   CBY0:  if(ls) goto CLK0 /* C>M, C>Y */ mdata - ydata
   CBK0:  if(ls) goto MLY0 /* C>M, C>Y, C>K */ mdata - kdata
   MBY0:  if(ls) goto MLK0 /* C>M, C>Y, C>K, M>Y */ ydata - kdata
   MBK0:  if(ls) goto YLK0 /* C>M, C>Y, C>K, M>Y, M>K */
          nop YBK0:  /* C>M>Y>K */    /* C>M, C>Y, C>K, M>Y, M>K, Y>K */
          /* Put primary amount in table. */
          *cpointer++ = cval = cval - mval
          /* Put primary index in table. */
          *mpointer++ = cval = int(cval)
          pri_offset = C_OFFSET
          /* Put secondary amount in table. */
          *cpointer++ = mval = mval - yval
          /* Put secondary index in table. */
          *mpointer++ = mval = int(mval)
          sec_offset = B_OFFSET
          /* Put tertiary amount in table. */
          *cpointer++ = yval = yval - kval
          /* Put tertiary index in table. */
          *mpointer++ = yval = int(yval)
          ter_offset = T_OFFSET
          /* Put 4-color black amount in table. */
          *cpointer = kval = kval
          /* Put 4-color black index in table. */
          *mpointer = kval = int(kval)
          goto DoneComp
          nop YLK0:  /* C>M>K>Y */    /* C>M, C>Y, C>K, M>Y, M>K, Y<K */
          /* Put primary amount in table. */
          *cpointer++ = cval = cval - mval
          /* Put primary index in table. */
          *mpointer++ = cval = int(cval)
          pri_offset = C_OFFSET
          /* Put secondary amount in table. */
          *cpointer++ = mval = mval - kval
          /* Put secondary index in table. */
          *mpointer++ = mval = int(mval)
          sec_offset = B_OFFSET
          /* Put tertiary amount in table. */
          *cpointer++ = kval = kval - yval
          /* Put tertiary index in table. */
          *mpointer++ = kval = int(kval)
          ter_offset = BK_OFFSET
          /* Put 4-color black amount in table. */
          *cpointer = yval = yval
          /* Put 4-color black index in table. */
          *mpointer = yval = int(yval)
          goto DoneComp
          nop MLK0:  /* C>K>M>Y */    /* C>M, C>Y, C>K, M>Y, M<K */
          /* Put primary amount in table. */
```

```
        *cpointer++ = cval = cval - kval
        /* Put primary index in table. */
        *mpointer++ = cval = int(cval)
        pri_offset = C_OFFSET
        /* Put secondary amount in table. */
        *cpointer++ = kval = kval - mval
        /* Put secondary index in table. */
        *mpointer++ = kval = int(kval)
        sec_offset = CK_OFFSET
        /* Put tertiary amount in table. */
        *cpointer++ = mval = mval - yval
        /* Put tertiary index in table. */
        *mpointer++ = mval = int(mval)
        ter_offset = BK_OFFSET
        /* Put 4-color black amount in table. */
        *cpointer = yval = yval
        /* Put 4-color black index in table. */
        *mpointer = yval = int(yval)
        goto DoneComp
        nop MLY0:   if(ls) goto MLK1  /* C>M, C>Y, C>K, M<Y */
        ydata - kdata MBK1:   /* C>Y>M>K */     /* C>M, C>Y, C>K, M<Y, M>K, Y>K */
        /* Put primary amount in table. */
        *cpointer++ = cval = cval - yval
        /* Put primary index in table. */
        *mpointer++ = cval = int(cval)
        pri_offset = C_OFFSET
        /* Put secondary amount in table. */
        *cpointer++ = yval = yval - mval
        /* Put secondary index in table. */
        *mpointer++ = yval = int(yval)
        sec_offset = G_OFFSET
        /* Put tertiary amount in table. */
        *cpointer++ = mval = mval - kval
        /* Put tertiary index in table. */
        *mpointer++ = mval = int(mval)
        ter_offset = T_OFFSET
        /* Put 4-color black amount in table. */
        *cpointer = kval = kval
        /* Put 4-color black index in table. */
        *mpointer = kval = int(kval)
        goto DoneComp
        nop MLK1:   if(ls) goto YLK2 /* C>M, C>Y, C>K, M<Y, M<K */
        nop
        /* C>Y>K>M */    /* C>M, C>Y, C>K, M<Y, M<K, Y>K */
        /* Put primary amount in table. */
        *cpointer++ = cval = cval - yval
        /* Put primary index in table. */
        *mpointer++ = cval = int(cval)
        pri_offset = C_OFFSET
        /* Put secondary amount in table. */
        *cpointer++ = yval = yval - kval
        /* Put secondary index in table. */
        *mpointer++ = yval = int(yval)
        sec_offset = G_OFFSET
        /* Put tertiary amount in table. */
        *cpointer++ = kval = kval - mval
        /* Put tertiary index in table. */
        *mpointer++ = kval = int(kval)
        ter_offset = GK_OFFSET
        /* Put 4-color black amount in table. */
        *cpointer = mval = mval
        /* Put 4-color black index in table. */
        *mpointer = mval = int(mval)
        goto DoneComp
        nop
```

```
YLK2:   /* C>K>Y>M */    /* C>M, C>Y, C>K, M<Y, M>K, Y<K */
        /* Put primary amount in table. */
        *cpointer++ = cval = cval - kval
        /* Put primary index in table. */
        *mpointer++ = cval = int(cval)
        pri_offset = C_OFFSET
        /* Put secondary amount in table. */
        *cpointer++ = kval = kval - yval
        /* Put secondary index in table. */
        *mpointer++ = kval = int(kval)
        sec_offset = CK_OFFSET
        /* Put tertiary amount in table. */
        *cpointer++ = yval = yval - mval
        /* Put tertiary index in table. */
        *mpointer++ = yval = int(yval)
        ter_offset = GK_OFFSET
        /* Put 4-color black amount in table. */
        *cpointer = mval = mval
        /* Put 4-color black index in table. */
        *mpointer = mval = int(mval)
        goto DoneComp
        nop CLK0:   if(1s) goto MLY1 /* C>M, C>Y, C<K */ mdata - kdata
MBY1:   /* K>C>M>Y */    /* C>M, C>Y, C<K, M>Y */
        /* Put primary amount in table. */
        *cpointer++ - kval = kval - cval
        /* Put primary index in table. */
        *mpointer++ = kval = int(kval)
        pri_offset = K_OFFSET
        /* Put secondary amount in table. */
        *cpointer++ = cval = cval - mval
        /* Put secondary index in table. */
        *mpointer++ = cval = int(cval)
        sec_offset = CK_OFFSET
        /* Put tertiary amount in table. */
        *cpointer++ = mval = mval - yval
        /* Put tertiary index in table. */
        *mpointer++ = mval = int(mval)
        ter_offset = BK_OFFSET
        /* Put 4-color black amount in table. */
        *cpointer = yval = yval
        /* Put 4-color black index in table. */
        *mpointer = yval = int(yval)
        goto DoneComp
        nop MLY1:   /* K>C>Y>M */    /* C>M, C>Y, C<K, M<Y */
        /* Put primary amount in table. */
        *cpointer++ = kval = kval - cval
        /* Put primary index in table. */
        *mpointer++ = kval = int(kval)
        pri_offset = K_OFFSET
        /* Put secondary amount in table. */
        *cpointer++ = cval = cval - yval
        /* Put secondary index in table. */
        *mpointer++ = cval = int(cval)
        sec_offset = CK_OFFSET
        /* Put tertiary amount in table. */
        *cpointer++ = yval = yval - mval
        /* Put tertiary index in table. */
        *mpointer++ = yval = int(yval)
        ter_offset = GK_OFFSET
        /* Put 4-color black amount in table. */
        *cpointer = mval = mval
```

```
        /* Put 4-color black index in table. */
        *mpointer = mval = int(mval)
        goto DoneComp
        nop CLY0:   if(ls) goto CLK1 /* C>M, C<Y */ mdata - kdata
CBK1:   if(ls) goto MLK5 /* C>M, C<Y, C>K */
        nop

MBK5:   /* Y>C>M>K */    /* C>M, C<Y, C>K, M>K */
        /* Put primary amount in table. */
        *cpointer++ = yval = yval - cval
        /* Put primary index in table. */
        *mpointer++ = yval = int(yval)
        pri_offset = Y_OFFSET
        /* Put secondary amount in table. */
        *cpointer++ = cval = cval - mval
        /* Put secondary index in table. */
        *mpointer++ = cval = int(cval)
        sec_offset = G_OFFSET
        /* Put tertiary amount in table. */
        *cpointer++ = mval = mval - kval
        /* Put tertiary index in table. */
        *mpointer++ = mval = int(mval)
        ter_offset = T_OFFSET
        /* Put 4-color black amount in table. */
        *cpointer = kval = kval
        /* Put 4-color black index in table. */
        *mpointer = kval = int(kval)
        goto DoneComp
        nop MLK5:   /* Y>C>K>M */    /* C>M, C<Y, C>K, M<K */
        /* Put primary amount in table. */
        *cpointer++ = yval = yval - cval
        /* Put primary index in table. */
        *mpointer++ = yval = int(yval)
        pri_offset = Y_OFFSET
        /* Put secondary amount in table. */
        *cpointer++ = cval = cval - kval
        /* Put secondary index in table. */
        *mpointer++ = cval = int(cval)
        sec_offset = G_OFFSET
        /* Put tertiary amount in table. */
        *cpointer++ = kval = kval - mval
        /* Put tertiary index in table. */
        *mpointer++ = kval = int(kval)
        ter_offset = GK_OFFSET
        /* Put 4-color black amount in table. */
        *cpointer = mval = mval
        /* Put 4-color black index in table. */
        *mpointer = mval = int(mval)
        goto DoneComp
        nop CLK1:   ydata - kdata    /* C>M, C<Y, C<K, (M<Y), (M<K) */

MLK7:   if(ls) goto YLK15
        nop

YBK15:  /* Y>K>C>M */    /* C>M, C<Y, C<K, M<Y, M<K, Y>K */
        /* Put primary amount in table. */
        *cpointer++ = yval = yval - kval
        /* Put primary index in table. */
        *mpointer++ = yval = int(yval)
```

```
            pri_offset = Y_OFFSET
            /* Put secondary amount in table. */
            *cpointer++ = kval = kval - cval
            /* Put secondary index in table. */
            *mpointer++ = kval = int(kval)
            sec_offset = YK_OFFSET
            /* Put tertiary amount in table. */
            *cpointer++ = cval = cval - mval
            /* Put tertiary index in table. */
            *mpointer++ = cval = int(cval)
            ter_offset = GK_OFFSET
            /* Put 4-color black amount in table. */
            *cpointer = mval = mval
            /* Put 4-color black index in table. */
            *mpointer = mval = int(mval)
            goto DoneComp
            nop YLK15:  /* K>Y>C>M */    /* C>M, C<Y, C<K, M<Y, M<K, Y<K */
            /* Put primary amount in table. */
            *cpointer++ = kval = kval - yval
            /* Put primary index in table. */
            *mpointer++ = kval = int(kval)
            pri_offset = K_OFFSET
            /* Put secondary amount in table. */
            *cpointer++ = yval = yval - cval
            /* Put secondary index in table. */
            *mpointer++ = yval = int(yval)
            sec_offset = YK_OFFSET
            /* Put tertiary amount in table. */
            *cpointer++ = cval = cval - mval
            /* Put tertiary index in table. */
            *mpointer++ = cval = int(cval)
            ter_offset = GK_OFFSET
            /* Put 4-color black amount in table. */
            *cpointer = mval = mval
            /* Put 4-color black index in table. */
            *mpointer = mval = int(mval)
            goto DoneComp
            nop CLM:    if(ls) goto CLY1 /* C<M */ cdata - kdata
    CBY1:   if(ls) goto CLK2 /* C<M, C>Y */ mdata - ydata
    CBK2:   ydata - kdata    /* C<M, C>Y, C>K, (M>Y), (M>K) */

MBK8:   if(ls) goto YLK16 /* C<M, C>Y, C>K, M>Y, M>K */
            nop

YBK16:  /* M>C>Y>K */    /* C<M, C>Y, C>K, M>Y, M>K, Y>K */
            /* Put primary amount in table. */
            *cpointer++ = mval = mval - cval
            /* Put primary index in table. */
            *mpointer++ = mval = int(mval)
            pri_offset = M_OFFSET
            /* Put secondary amount in table. */
            *cpointer++ = cval = cval - yval
            /* Put secondary index in table. */
            *mpointer++ = cval = int(cval)
            sec_offset = B_OFFSET
            /* Put tertiary amount in table. */
            *cpointer++ = yval = yval - kval
            /* Put tertiary index in table. */
            *mpointer++ = yval = int(yval)
            ter_offset = T_OFFSET
            /* Put 4-color black amount in table. */
```

```
        *cpointer = kval = kval
        /* Put 4-color black index in table. */
        *mpointer = kval = int(kval)
        goto DoneComp
        nop YLK16:  /* M>C>K>Y */    /* C<M, C>Y, C>K, M>Y, M>K, Y<K */
        /* Put primary amount in table. */
        *cpointer++ = mval = mval - cval
        /* Put primary index in table. */
        *mpointer++ = mval = int(mval)
        pri_offset = M_OFFSET
        /* Put secondary amount in table. */
        *cpointer++ = cval = cval - kval
        /* Put secondary index in table. */
        *mpointer++ = cval = int(cval)
        sec_offset = B_OFFSET
        /* Put tertiary amount in table. */
        *cpointer++ = kval = kval - yval
        /* Put tertiary index in table. */
        *mpointer++ = kval = int(kval)
        ter_offset = BK_OFFSET
        /* Put 4-color black amount in table. */
        *cpointer = yval = yval
        /* Put 4-color black index in table. */
        *mpointer = yval = int(yval)
        goto DoneComp
        nop CLK2:   mdata - kdata     /* C<M, C>Y, C<K, (M>Y) */

MBY5:   if(ls) goto MLK10 /* C<M, C>Y, C<K, M>Y */
        nop

YLK20:  /* M>K>C>Y */    /* C<M, C>Y, C<K, M>Y, M>K, (Y<K) */
        /* Put primary amount in table. */
        *cpointer++ = mval = mval - kval
        /* Put primary index in table. */
        *mpointer++ = mval = int(mval)
        pri_offset = M_OFFSET
        /* Put secondary amount in table. */
        *cpointer++ = kval = kval - cval
        /* Put secondary index in table. */
        *mpointer++ = kval = int(kval)
        sec_offset = MK_OFFSET
        /* Put tertiary amount in table. */
        *cpointer++ = cval = cval - yval
        /* Put tertiary index in table. */
        *mpointer++ = cval = int(cval)
        ter_offset = BK_OFFSET
        /* Put 4-color black amount in table. */
        *cpointer = yval = yval
        /* Put 4-color black index in table. */
        *mpointer = yval = int(yval)
        goto DoneComp
        nop MLK10:  /* K>M>C>Y */    /* C<M, C>Y, C<K, M>Y, M<K, (Y<K) */
        /* Put primary amount in table. */
        *cpointer++ = kval = kval - mval
        /* Put primary index in table. */
        *mpointer++ = kval = int(kval)
        pri_offset = K_OFFSET
        /* Put secondary amount in table. */
        *cpointer++ = mval = mval - cval
        /* Put secondary index in table. */
        *mpointer++ = mval = int(mval)
        sec_offset = MK_OFFSET
```

```
        /* Put tertiary amount in table. */
        *cpointer++ = cval = cval - yval
        /* Put tertiary index in table. */
        *mpointer++ = cval = int(cval)
        ter_offset = BK_OFFSET
        /* Put 4-color black amount in table. */
        *cpointer = yval = yval
        /* Put 4-color black index in table. */
        *mpointer = yval = int(yval)
        goto DoneComp
        nop CLY1:   if(ls) goto CLK3 /* C<M, C<Y */ mdata - ydata
CBK3:   if(ls) goto MLY6 /* C<M, C<Y, C>K */
        nop

MBY6:   /* M>Y>C>K */    /* C<M, C<Y, C>K, M>Y, (M>K), (Y<K) */
        /* Put primary amount in table. */
        *cpointer++ = mval = mval - yval
        /* Put primary index in table. */
        *mpointer++ = mval = int(mval)
        pri_offset = M_OFFSET
        /* Put secondary amount in table. */
        *cpointer++ = yval = yval - cval
        /* Put secondary index in table. */
        *mpointer++ = yval = int(yval)
        sec_offset = R_OFFSET
        /* Put tertiary amount in table. */
        *cpointer++ = cval = cval - kval
        /* Put tertiary index in table. */
        *mpointer++ = cval = int(cval)
        ter_offset = T_OFFSET
        /* Put 4-color black amount in table. */
        *cpointer = kval = kval
        /* Put 4-color black index in table. */
        *mpointer = kval = int(kval)
        goto DoneComp
        nop
MLY6:   /* Y>M>C>K */    /* C<M, C<Y, C>K, M<Y, (M>K), (Y>K) */
        /* Put primary amount in table. */
        *cpointer++ = yval = yval - mval
        /* Put primary index in table. */
        *mpointer++ = yval = int(yval)
        pri_offset = Y_OFFSET
        /* Put secondary amount in table. */
        *cpointer++ = mval = mval - cval
        /* Put secondary index in table. */
        *mpointer++ = mval = int(mval)
        sec_offset = R_OFFSET
        /* Put tertiary amount in table. */
        *cpointer++ = cval = cval - kval
        /* Put tertiary index in table. */
        *mpointer++ = cval = int(cval)
        ter_offset = T_OFFSET
        /* Put 4-color black amount in table. */
        *cpointer = kval = kval
        /* Put 4-color black index in table. */
        *mpointer = kval = int(kval)
        goto DoneComp
        nop CLK3:   if(ls) goto MLY7 /* C<M, C<Y, C<K */ mdata - kdata
MBY7:   if(ls) goto MLK14 /* C<M, C<Y, C<K, M>Y */ ydata - kdata
```

```
MBK14:  if(ls) goto YLK28  /* C<M, C<Y, C<K, M>Y, M>K */
        nop

YBK28:  /* M>Y>K>C */    /* C<M, C<Y, C<K, M>Y, M>K, Y>K */
        /* Put primary amount in table. */
        *cpointer++ = mval = mval - yval
        /* Put primary index in table. */
        *mpointer++ = mval = int(mval)
        pri_offset = M_OFFSET
        /* Put secondary amount in table. */
        *cpointer++ = yval = yval - kval
        /* Put secondary index in table. */
        *mpointer++ = yval = int(yval)
        sec_offset = R_OFFSET
        /* Put tertiary amount in table. */
        *cpointer++ = kval = kval - cval
        /* Put tertiary index in table. */
        *mpointer++ = kval = int(kval)
        ter_offset = RK_OFFSET
        /* Put 4-color black amount in table. */
        *cpointer = cval = cval
        /* Put 4-color black index in table. */
        *mpointer = cval = int(cval)
        goto DoneComp
        nop YLK28:  /* M>K>Y>C */    /* C<M, C<Y, C<K, M>Y, M>K, Y<K */
        /* Put primary amount in table. */
        *cpointer++ = mval = mval - kval
        /* Put primary index in table. */
        *mpointer++ = mval = int(mval)
        pri_offset = M_OFFSET
        /* Put secondary amount in table. */
        *cpointer++ = kval = kval - yval
        /* Put secondary index in table. */
        *mpointer++ = kval = int(kval)
        sec_offset = MK_OFFSET
        /* Put tertiary amount in table. */
        *cpointer++ = yval = yval - cval
        /* Put tertiary index in table. */
        *mpointer++ = yval = int(yval)
        ter_offset = RK_OFFSET
        /* Put 4-color black amount in table. */
        *cpointer = cval = cval
        /* Put 4-color black index in table. */
        *mpointer = cval = int(cval)
        goto DoneComp
        nop MLK14:  /* K>M>Y>C */    /* C<M, C<Y, C<K, M>Y, M<K, (Y<K) */
        /* Put primary amount in table. */
        *cpointer++ = kval = kval - mval
        /* Put primary index in table. */
        *mpointer++ = kval = int(kval)
        pri_offset = K_OFFSET
        /* Put secondary amount in table. */
        *cpointer++ = mval = mval - yval
        /* Put secondary index in table. */
        *mpointer++ = mval = int(mval)
        sec_offset = MK_OFFSET
        /* Put tertiary amount in table. */
        *cpointer++ = yval = yval - cval
        /* Put tertiary index in table. */
        *mpointer++ = yval = int(yval)
        ter_offset = RK_OFFSET
        /* Put 4-color black amount in table. */
        *cpointer = cval = cval
        /* Put 4-color black index in table. */
        *mpointer = cval = int(cval)
```

```
                goto DoneComp
                nop

MLY7:   if(ls) goto MLK15  /* C<M, C<Y, C<K, M<Y */ ydata - kdata
MBK15:  /* Y>M>K>C */      /* C<M, C<Y, C<K, M<Y, M>K, (Y>K) */
                /* Put primary amount in table. */
                *cpointer++ = yval = yval - mval
                /* Put primary index in table. */
                *mpointer++ = yval = int(yval)
                pri_offset = Y_OFFSET
                /* Put secondary amount in table. */
                *cpointer++ = mval = mval - kval
                /* Put secondary index in table. */
                *mpointer++ = mval = int(mval)
                sec_offset = R_OFFSET
                /* Put tertiary amount in table. */
                *cpointer++ = kval = kval - cval
                /* Put tertiary index in table. */
                *mpointer++ = kval = int(kval)
                ter_offset = RK_OFFSET
                /* Put 4-color black amount in table. */
                *cpointer = cval = cval
                /* Put 4-color black index in table. */
                *mpointer = cval = int(cval)
                goto DoneComp
                nop MLK15:  if(ls) goto YLK31  /* C<M, C<Y, C<K, M<Y, M<K */
                nop YBK31:  /* Y>K>M>C */      /* C<M, C<Y, C<K, M<Y, M<K, Y>K */
                /* Put primary amount in table. */
                *cpointer++ = yval = yval - kval
                /* Put primary index in table. */
                *mpointer++ = yval = int(yval)
                pri_offset = Y_OFFSET
                /* Put secondary amount in table. */
                *cpointer++ = kval = kval - mval
                /* Put secondary index in table. */
                *mpointer++ = kval = int(kval)
                sec_offset = YK_OFFSET
                /* Put tertiary amount in table. */
                *cpointer++ = mval = mval - cval
                /* Put tertiary index in table. */
                *mpointer++ = mval = int(mval)
                ter_offset = RK_OFFSET
                /* Put 4-color black amount in table. */
                *cpointer = cval = cval
                /* Put 4-color black index in table. */
                *mpointer = cval = int(cval)
                goto DoneComp
                nop YLK31:  /* K>Y>M>C */      /* C<M, C<Y, C<K, M<Y, M<K, Y<K */
                /* Put primary amount in table. */
                *cpointer++ = kval = kval - yval
                /* Put primary index in table. */
                *mpointer++ = kval = int(kval)
                pri_offset = K_OFFSET
                /* Put secondary amount in table. */
                *cpointer++ = yval = yval - mval
                /* Put secondary index in table. */
                *mpointer++ = yval = int(yval)
                sec_offset = YK_OFFSET
                /* Put tertiary amount in table. */
                *cpointer++ = mval = mval - cval
                /* Put tertiary index in table. */
                *mpointer++ = mval = int(mval)
```

```
        ter_offset = RK_OFFSET
        /* Put 4-color black amount in table. */
        *cpointer = cval = cval
        /* Put 4-color black index in table. */
        *mpointer = cval = int(cval)

DoneComp: /* Set pointer for amounts. */
        cpointer = Colors
        /* Set pointer for indexes. */
        mpointer = Indexes /* Find coefficients now. */

/* The tables are now set up, let's start the calculations. */
        /* mpointer is now set to the beginning of a table which    */
        /* includes the following four integers used to index array */
        /* table lookup:                                             */
        /*      Primary color index                                  */
        /*      Secondary color index                                */
        /*      Tertiary color index                                 */
        /*      4-color Black index                                  */

/* cpointer is now set to the beginning of a table which    */
        /* includes the following four floating point values:       */
        /*      Primary color value                                  */
        /*      Secondary color value                                */
        /*      Tertiary color value                                 */
        /*      4-color Black value                                  */

/* pri_offset contains the offset which will give us the    */
        /* coefficients for the proper primary color                 */
        /* (C, M, Y, or K).  sec_offset contains the offset which   */
        /* give the proper secondary color (R, G, B, CK, MK, or YK)*/
        /* and ter_offset contains the offset to get the proper     */
        /* tertiary color (3, RK, GK, BK).                          */ inc_reg = 64

/* First, calculate the primary color coefficient pointer. */
T_done: kpointer = *mpointer++ /* Get table offset for primary color. */
        ypointer = TLU         /* Get base of table. */
        kpointer = kpointer/2  /* Divide offset by two. */
        kpointer = kpointer & 0xfe /* Make offset (index) an even number. */
        ypointer = ypointer + kpointer /* Find address of pointer to array. */
        treg = *ypointer       /* Get address of array. */ kpointer = *mpointer++ /* Get table offset for secondary color. */
        treg = treg + pri_offset /* Get address of first coefficient. */
        /* Now calculate 4 colors based on the primary color. */
        cval = *treg++inc_reg * *cpointer
        mval = *treg++inc_reg * *cpointer
        yval = *treg++inc_reg * *cpointer
        kval = *treg++inc_reg * *cpointer++

/* Next, we calculate the secondary color coefficient pointer. */
        /* kpointer = *mpointer++ */ /* Get table offset (done above). */
        ypointer = TLU         /* Get base of table. */
        kpointer = kpointer/2
        kpointer = kpointer & 0xfe /* Make offset (index) an even number. */
        ypointer = ypointer + kpointer /* Find address of pointer to array. */
        treg = *ypointer       /* Get address of array. */ kpointer = *mpointer++ /* Get table offset (index) for tertiary color. */
        treg = treg + sec_offset /* Get address of first coefficient. */
        /* Now calculate 4 colors based on the secondary color. */
```

```
        cval = cval + *treg++inc_reg * *cpointer
        mval = mval + *treg++inc_reg * *cpointer
        yval = yval + *treg++inc_reg * *cpointer
        kval = kval + *treg++inc_reg * *cpointer++

/* Next, we calculate the tertiary color coefficient pointer. */
        /* kpointer = *mpointer++ */ /* Get table offset (done above). */
        ypointer = TLU      /* Get base of table. */
        kpointer = kpointer/2
        kpointer = kpointer & 0xfe /* Make offset (index) an even number. */
        ypointer = ypointer + kpointer /* Find address of pointer to array. */
        treg = *ypointer        /* Get address of array. */ kpointer = *mpointer++ /* Get table offset (index) for black color. */
        treg = treg + ter_offset /* Get address of first coefficient. */
        /* Now calculate 4 colors based on the tertiary color. */
        cval = cval + *treg++inc_reg * *cpointer
        mval = mval + *treg++inc_reg * *cpointer
        yval = yval + *treg++inc_reg * *cpointer
        kval = kval + *treg++inc_reg * *cpointer++

/* Last, we calculate the 4-color black coefficient pointer. */
        /* kpointer = *mpointer++ */ /* Get table offset (done above). */
        ypointer = TLU      /* Get base of table. */
        kpointer = kpointer/2
        kpointer = kpointer & 0xfe /* Make offset (index) an even number. */
        ypointer = ypointer + kpointer /* Find address of pointer to array. */
        treg = *ypointer        /* Get address of array. */ wpointer = Ocolors
        treg = treg + TK_OFFSET /* Get address of first coefficient. */
        /* Now calculate 4 colors based on the black color. */
        /* We will also test for underflow here. */
        cval = cval + *treg++inc_reg * *cpointer
        cval = ifalt(*flpoint)
        mval = mval + *treg++inc_reg * *cpointer
        mval = ifalt(*flpoint)
        yval = yval + *treg++inc_reg * *cpointer
        yval = ifalt(*flpoint)
        kval = kval + *treg++inc_reg * *cpointer
        kval = ifalt(*flpoint)

/* We will convert to integers here. */
        inc_reg=4
        *wpointer++inc_reg = cval = int(cval)
        *wpointer++inc_reg = mval = int(mval)
        *wpointer++inc_reg = yval = int(yval)
        *wpointer = kval = int(kval)
        treg = Dpoint           /* Get destination pointers. */
        cpointer = *treg++
        mpointer = *treg++
        ypointer = *treg++
        kpointer = *treg++

/* Convert data back to bytes. */
        wpointer = Ocolors
        cdata = *wpointer++inc_reg /* Copy integers to regs. */
        mdata = *wpointer++inc_reg
        ydata = *wpointer++inc_reg
        kdata = *wpointer ter_offset=0xffff       /* This is to replace overflowed data. */
Datahere: cdata - 255           /* Did it overflow? */
        if(le) goto Ok1
        treg=Dpoint             /* Reset this register for next pass. */
        cdata = ter_offset
Ok1:    mdata - 255             /* Did it overflow? */
        if(le) goto Ok2
```

```
            *cpointer++ = cdata1    /* Write previous byte. */
            mdata = ter_offset
Ok2:        ydata - 255             /* Did it overflow? */
            if(le) goto Ok3
            *mpointer++ = mdata1    /* Write previous byte. */
            ydata = ter_offset
Ok3:        kdata - 255             /* Did it overflow? */
            if(le) goto Ok4
            *ypointer++ = ydata1    /* Write previous byte. */
            kdata = ter_offset
Ok4:
            *kpointer++ = kdata1    /* Write previous byte. */

/* Keep going until we do all pixels. */
            if (counter-->=0) goto Getdata
            wpointer = Ocolors Complete: r14 = 0x69
          goto Wait_for_go          /* Go wait for next line. */
          *Doneflag=r14             /* Signal PC that DSP32 is done. */

Zero:     float 0.0
Dpoint:   4 * int
Ocolors:  4 * float                 /* Original colors. */
Colors:   4 * float                 /* Calculated colors. */
Indexes:  8 * int                   /* Calculated color indexes. */
TLU:      int Table_base            /* Table lookup. */
          int Table_base+(4*  64)
          int Table_base+(4* 128)
          int Table_base+(4* 192)
          int Table_base+(4* 256)
          int Table_base+(4* 320)
          int Table_base+(4* 384)
          int Table_base+(4* 448)
          int Table_base+(4* 512)
          int Table_base+(4* 576)
          int Table_base+(4* 640)
          int Table_base+(4* 704)
          int Table_base+(4* 768)
          int Table_base+(4* 832)
          int Table_base+(4* 896)
          int Table_base+(4* 960)
          int Table_base+(4*1024)
          int Table_base+(4*1088)
          int Table_base+(4*1152)
          int Table_base+(4*1216)
          int Table_base+(4*1280)
          int Table_base+(4*1344)
          int Table_base+(4*1408)
          int Table_base+(4*1472)
          int Table_base+(4*1536)
          int Table_base+(4*1600)
          int Table_base+(4*1664)
          int Table_base+(4*1728)
          int Table_base+(4*1792)
          int Table_base+(4*1856)
          int Table_base+(4*1920)
          int Table_base+(4*1984)
          int Table_base+(4*2048)
          int Table_base+(4*2112)
          int Table_base+(4*2176)
          int Table_base+(4*2240)
          int Table_base+(4*2304)
          int Table_base+(4*2368)
          int Table_base+(4*2432)
          int Table_base+(4*2496)
          int Table_base+(4*2560)
          int Table_base+(4*2624)
          int Table_base+(4*2688)
          int Table_base+(4*2752)
```

```
                    int Table_base+(4*2816)
                    int Table_base+(4*2880)
                    int Table_base+(4*2944)
                    int Table_base+(4*3008)
                    int Table_base+(4*3072)
                    int Table_base+(4*3136)
                    int Table_base+(4*3200)
                    int Table_base+(4*3264)
                    int Table_base+(4*3328)
                    int Table_base+(4*3392)
                    int Table_base+(4*3456)
                    int Table_base+(4*3520)
                    int Table_base+(4*3584)
                    int Table_base+(4*3648)
                    int Table_base+(4*3712)
                    int Table_base+(4*3776)
                    int Table_base+(4*3840)
                    int Table_base+(4*3904)
                    int Table_base+(4*3968)
                    int Table_base+(4*4032)

.=0x00a00
Points:     int
Inv_data:   int
Indata1:    int
Indata2:    int
Indata3:    int
Indata4:    int
Startflag:  int
Doneflag:   int
```

Appendix B

```
/*********************************************************************/
/*                                                                   */
/*  Property of E. I. duPont de Nemours & Company, Wilmington, DE    */
/*                                                                   */
/*                                                                   */
/*  This software is proprietary.  The program source, listing, binary */
/*  and executable files are duPont Company property and may not be  */
/*  distributed or copied for non-duPont use without the expressed   */
/*  written approval of Company management.                          */
/*                                                                   */
/*  Copyright 1989 EI duPont & Co.                                   */
/*                                                                   */
/*********************************************************************/

/*********************************************************************/
/*                                                                   */
/*  FILE:    COLCOR50.S -- 4CAST COLOR CONVERSION PROGRAM FOR DSP32  */
/*                                                                   */
/*  PURPOSE: Routines for color conversion with DSP32 hardware.      */
/*                                                                   */
/*  AUTHOR:  George T. Warner                                        */
/*                                                                   */
/*  NOTES:                                                           */
/*       Program starts at address 0 and waits for nonzero data to be */
/*       written to the Startflag address.                           */
/*       Variables at address 0x0800 of RAM must be initialized      */
/*       before setting the Startflag.                               */
/*       The results are stored back to the location of the input   */
/*       data.                                                       */
/*       Program completes by writing to the Doneflag address.      */
/*                                                                   */
/*  REVISIONS:                                                       */
/*    11/21/89  Completely rewritten and highly optimized (80% faster). */
/*     7/27/89  Taken from cc_50_16.s.                               */
/*     7/17/89  First version written with new handshaking.         */
/*     7/12/89  First version for DSP32C taken from COLCOR4.DSP.    */
/*                                                                   */
/*********************************************************************/
```

```
/***************************************************************/
/*                                                             */
/* Memory Map:  0x0000-0x07ff  Program code                    */
/*              0x0800-0x0fff  Variables                       */
/*              0x1000-0x1fff  Line 0, color 0 data            */
/*              0x2000-0x2fff  Line 0, color 1 data            */
/*              0x3000-0x3fff  Line 0, color 2 data            */
/*              0x4000-0x4fff  Line 0, color 3 data            */
/*              0x5000-0x8fff  Correction matrices in CMYKRGB3 format. */
/*              0x9000-0x9fff  Line 1, color 0 data            */
/*              0xa000-0xafff  Line 1, color 1 data            */
/*              0xb000-0xbfff  Line 1, color 2 data            */
/*              0xc000-0xcfff  Line 1, color 3 data            */
/*                                                             */
/***************************************************************/ define TITLE "4Cast DSP32 Color Correction Program"
define VERSION_DSP32_COLCOR "Version 1.11, 11/20/89"
.rsect ".bank0"

.global Points, Inv_data, Indata1, Indata2, Indata3, Indata4
.global Start, Noinv, T_done, Getdata, Startflag, Wait_for_go
.global Datahere, Ok1, Ok2, Ok3, Ok4, Complete /* Description of matrix coefficient order.                    */
/* This order was originally chosen to reduce the number       */
/* of pointer calculations.  The latest code does not require  */
/* this specific order, but it is kept to maintain compatibility */
/* with the PC code.                                           */
#define CYAN_OFFSET     28
#define MAGENTA_OFFSET  24
#define YELLOW_OFFSET   20
#define BLACK_OFFSET    0
#define RED_OFFSET      8
#define GREEN_OFFSET    12
#define BLUE_OFFSET     16
#define CB3_OFFSET      4

/* This can be used at a later date when the */
/* coefficients are put in a logical order.  */
/* #define CYAN_OFFSET     0
#define MAGENTA_OFFSET  4
#define YELLOW_OFFSET   8
#define BLACK_OFFSET    12
#define RED_OFFSET      16
#define GREEN_OFFSET    20
#define BLUE_OFFSET     24
define CB3_OFFSET      28 */ define cpointer r1     /* Cyan pointer. */
define mpointer r2     /* Magenta pointer. */
#define ypointer r3     /* Yellow pointer. */
#define kpointer r4     /* Black pointer. */
#define cwpointer r5    /* Cyan work pointer. */
#define mwpointer r6    /* Magenta work pointer. */
#define pri_offset r7   /* Primary color offset. */
#define sec_offset r8   /* Secondary color offset. */
#define cdata r9        /* Cyan data. */
#define mdata r10       /* Magenta data. */
#define ydata r11       /* Yellow data. */
#define kdata r12       /* Black data. */
#define cdatal r91      /* Cyan data, low byte. */
#define mdatal r101     /* Magenta data, low byte. */
#define ydatal r111     /* Yellow data, low byte. */
#define kdatal r121     /* Black data, low byte. */
#define treg r13        /* Temporary register. */
#define flpoint r14     /* Temporary pointer to a float. */
#define counter r15     /* Pixel counter. */
```

```
#define of_reg   r16      /* Overflow data register. */
#define inc_reg  r17      /* Increment register. */
#define cval     a0       /* Cyan multiplier. */
#define mval     a1       /* Magenta multiplier. */
#define yval     a2       /* Yellow multiplier. */
#define kval     a3       /* Black multiplier. */
#define Table_base 0x5000 /* Start of coefficient table. */

Start: treg = 0
       pcw = treg              /* This command for the DSP32C. */
       *Startflag = treg       /* Clear startflag. */
       *Doneflag = treg        /* Clear doneflag. */
       of_reg=0xffff           /* This is to replace overflowed data. */

Wait_for_go: treg = 0
Wait1: counter = *Startflag
       nop
       if (eq) goto Wait1      /* Wait for Startflag to be set. */
       nop
       *Startflag = treg       /* Clear Startflag. */
       *Doneflag = treg        /* Clear Doneflag. */ counter = *Points       /* Get number of points to do. */
       inc_reg = 8             /* Set increment register to 4. */
       counter = counter-1     /* Decrement by one. */ cpointer = *Indata1     /* Set pointers to input data. */
       mpointer = *Indata2
       ypointer = *Indata3
       kpointer = *Indata4
       cwpointer = Ocolors     /* Set floating point data pointers. */
       mwpointer = Ocolors
       flpoint = Zero
       treg = Dpoint Getdata: *treg++ = cpointer    /* Save pointers for later. */
       *treg++ = mpointer
       *treg++ = ypointer
       *treg++ = kpointer
       cdata1 = *cpointer      /* Read a byte. */
       mdata1 = *mpointer
       ydata1 = *ypointer
       kdata1 = *kpointer treg = *Inv_data        /* Test inverted data flag. */
       nop
       if(eq) goto Noinv       /* Go on if data not inverted. */
       inc_reg=4
       cdata = cdata ^ 0xff    /* Invert data. */
       mdata = mdata ^ 0xff
       ydata = ydata ^ 0xff
       kdata = kdata ^ 0xff Noinv: *cwpointer++inc_reg = cdata   /* Copy data to memory. */
       *cwpointer++inc_reg = mdata
       *cwpointer++inc_reg = ydata
       *cwpointer = kdata inc_reg = 8

/* Convert ints to floats. */
Convert: *cwpointer-- = kval = float(*cwpointer)
       *mwpointer++ = cval = float(*mwpointer)
       *cwpointer-- = yval = float(*cwpointer)
       *mwpointer-- = mval = float(*mwpointer)

/* Put black values in tables. */
       /* Set pointer to black amount. */
```

```
        cpointer = Colors+(3*4)
        /* Copy amount to table. */
        *cpointer-- = kval = kval
        /* Set pointer to black level. */
        mpointer = Levels+(3*2)
        /* Copy level to table. */
        *mpointer-- = kdata /* Calculate 3-color black component */
        /* Do this by finding the minimum value of C, M, or Y. */
        kval = -cval + mval
        cval = ifalt(mval)   /* cval now contains min(cval,mval). */
        /* nop
        nop */
        kval = -cval + yval
        cval = ifalt(yval)   /* cval now contains the 3-c black. */
        /* nop
        nop */
        /* Put 3C black amount in table. */
        *cpointer-- = cval = cval
        kval = cval          /* Put 3-c black value in kval. */
        *mpointer-- = cval = int(cval)

cval = *mwpointer /* Restore cyan for later computations. */

/* Find maximum color. */
        cdata-mdata
        if(hi) goto Cbigger
        cdata-ydata
Mbigger: mdata-ydata
        if(hi) goto Mbiggest
        nop
Ybiggest: cdata-mdata
        if(hi) goto GY
        nop
        goto RY
        nop
Mbiggest: cdata-ydata
        if(hi) goto BM
        nop
        goto RM
        nop
Cbigger: if(ls) goto Ybiggest
        nop
Cbiggest: mdata-ydata
        if(hi) goto BC
        nop GC:     /* Put green in table (after subtracting 3 color black). */
        *cpointer-- = mval = yval - kval
        /* Set green offset. */
        sec_offset = GREEN_OFFSET
        /* Put green level in table. */
        *mpointer-- = mval = int(yval)
        /* Put cyan value in table. */
        *cpointer = mval = cval - yval
        /* Put cyan level in table. */
        *mpointer = mval = int(cval)
        /* Set cyan offset. */
        pri_offset = CYAN_OFFSET /* Find coefficients now. */
        goto T_done
        inc_reg = 32

BC:     /* Put blue in table (after subtracting 3 color black). */
        *cpointer-- = yval = mval - kval
        /* Set blue offset. */
```

```
        sec_offset = BLUE_OFFSET
        /* Put blue level in table. */
        *mpointer-- = yval = int(mval)
        /* Put cyan value in table. */
        *cpointer = mval = cval - mval
        /* Put cyan level in table. */
        *mpointer = mval = int(cval)
        /* Set cyan offset. */
        pri_offset = CYAN_OFFSET /* Find coefficients now. */
        goto T_done
        inc_reg = 32

RM:     /* Put red in table (after subtracting 3 color black). */
        *cpointer-- = cval = yval - kval
        /* Set red offset. */
        sec_offset = RED_OFFSET
        /* Put red level in table. */
        *mpointer-- = cval = int(yval)
        /* Put magenta value in table. */
        *cpointer = cval = mval - yval
        /* Put magenta level in table. */
        *mpointer = cval = int(mval)
        /* Set magenta offset. */
        pri_offset = MAGENTA_OFFSET /* Find coefficients now. */
        goto T_done
        inc_reg = 32

BM:     /* Put blue in table (after subtracting 3 color black). */
        *cpointer-- = yval = cval - kval
        /* Set blue offset. */
        sec_offset = BLUE_OFFSET
        /* Put blue level in table. */
        *mpointer-- = yval = int(cval)
        /* Put magenta value in table. */
        *cpointer = yval = mval - cval
        /* Put magenta level in table. */
        *mpointer = yval = int(mval)
        /* Set magenta offset. */
        pri_offset = MAGENTA_OFFSET /* Find coefficients now. */
        goto T_done
        inc_reg = 32

GY:     /* Put green in table (after subtracting 3 color black). */
        *cpointer-- = mval = cval - kval
        /* Set green offset. */
        sec_offset = GREEN_OFFSET
        /* Put green level in table. */
        *mpointer-- = mval = int(cval)
        /* Put yellow value in table. */
        *cpointer = mval = yval - cval
        /* Put yellow level in table. */
        *mpointer = mval = int(yval)
        /* Set yellow offset. */
        pri_offset = YELLOW_OFFSET /* Find coefficients now. */
        goto T_done
        inc_reg = 32
```

RY:    /* Put red in table (after subtracting 3 color black). */
       *cpointer-- = cval = mval - kval
       /* Set red offset. */
       sec_offset = RED_OFFSET
       /* Put red level in table. */
       *mpointer-- = cval = int(mval)
       /* Put yellow value in table. */
       *cpointer = cval = yval - mval
       /* Put yellow level in table. */
       *mpointer = cval = int(yval)
       /* Set yellow offset. */
       pri_offset = YELLOW_OFFSET /* Find coefficients now. */

/* The tables are now set up, let's start the calculations. */
       /* mpointer is now set to the beginning of a table which     */
       /* includes the following four integers used to index array  */
       /* table lookup:                                             */
       /*     Primary color level                                   */
       /*     Secondary color level                                 */
       /*     Tertiary color level                                  */
       /*     Black color level                                     */

/* cpointer is now set to the beginning of a table which     */
       /* includes the following four floating point values:        */
       /*     Primary color value                                   */
       /*     Secondary color value                                 */
       /*     Tertiary color value                                  */
       /*     Black color value                                     */

/* pri_offset is set to the offset which will give us the    */
       /*     coefficients for the proper primary color             */
       /*     (C, M, or Y).                                         */
       /* sec_offset is set to the offset which will give us the    */
       /*     coefficients for the proper secondary color           */
       /*     (R, G, or B)*                                         */ inc_reg = 32

/* First, calculate the primary color coefficient pointer. */
T_done: kpointer = *mpointer++ /* Get table offset for primary color. */
        ypointer = TLU         /* Get base of table. */
        kpointer = kpointer & 0xfe /* Make offset (level) an even number. */
        ypointer = ypointer + kpointer /* Find address of pointer to array. */
        treg = *ypointer       /* Get address of array. */ kpointer = *mpointer++ /* Get table offset for secondary color. */
        treg = treg + pri_offset /* Get address of first coefficient. */
        /* Now calculate 4 colors based on the primary color. */
        cval = *treg++inc_reg * *cpointer
        mval = *treg++inc_reg * *cpointer
        yval = *treg++inc_reg * *cpointer
        kval = *treg++inc_reg * *cpointer++

/* Next, we calculate the secondary color coefficient pointer. */
        /* kpointer = *mpointer++ */ /* Get table offset (done above). */
        ypointer = TLU         /* Get base of table. */
        kpointer = kpointer & 0xfe /* Make offset (level) an even number. */
        ypointer = ypointer + kpointer /* Find address of pointer to array. */
        treg = *ypointer       /* Get address of array. */ kpointer = *mpointer++ /* Get table offset (level) for tertiary color. *
        treg = treg + sec_offset /* Get address of first coefficient. */
        /* Now calculate 4 colors based on the secondary color. */
        cval = cval + *treg++inc_reg * *cpointer
        mval = mval + *treg++inc_reg * *cpointer
        yval = yval + *treg++inc_reg * *cpointer
        kval = kval + *treg++inc_reg * *cpointer++

```
/* Next, we calculate the tertiary color coefficient pointer. */
/* kpointer = *mpointer++ */ /* Get table offset (done above). */
ypointer = TLU      /* Get base of table. */
kpointer = kpointer & 0xfe /* Make offset (level) an even number. */
ypointer = ypointer + kpointer /* Find address of pointer to array. */
treg = *ypointer        /* Get address of array. */ kpointer = *mpointer++ /* Get table offset (level) for black color. */
treg = treg + CB3_OFFSET /* Get address of first coefficient. */
/* Now calculate 4 colors based on the tertiary color. */
cval = cval + *treg++inc_reg * *cpointer
mval = mval + *treg++inc_reg * *cpointer
yval = yval + *treg++inc_reg * *cpointer
kval = kval + *treg++inc_reg * *cpointer++

/* Last, we calculate the black color coefficient pointer. */
/* kpointer = *mpointer++ */ /* Get table offset (done above). */
ypointer = TLU         /* Get base of table. */
kpointer = kpointer & 0xfe /* Make offset (level) an even number. */
ypointer = ypointer + kpointer /* Find address of pointer to array. */
treg = *ypointer        /* Get address of array. */ cwpointer = Ocolors
treg = treg + BLACK_OFFSET /* Get address of first coefficient. */
/* Now calculate 4 colors based on the black color. */
/* We will also test for underflow here. */
cval = cval + *treg++inc_reg * *cpointer
cval = ifalt(*flpoint)
mval = mval + *treg++inc_reg * *cpointer
mval = ifalt(*flpoint)
yval = yval + *treg++inc_reg * *cpointer
yval = ifalt(*flpoint)
kval = kval + *treg++inc_reg * *cpointer
kval = ifalt(*flpoint)

/* We will convert to integers here. */
inc_reg=4
*cwpointer++inc_reg = cval = int(cval)
*cwpointer++inc_reg = mval = int(mval)
*cwpointer++inc_reg = yval = int(yval)
*cwpointer = kval = int(kval)

treg = Dpoint          /* Get destination pointers. */
cpointer = *treg++
mpointer = *treg++
ypointer = *treg++
kpointer = *treg++

/* Convert data back to bytes. */
cwpointer = Ocolors
cdata = *cwpointer++inc_reg /* Copy integers to regs. */
mdata = *cwpointer++inc_reg
ydata = *cwpointer++inc_reg
kdata = *cwpointer Datahere:  cdata - 255           /* Did it overflow? */
           if(le) goto Ok1
           treg=Dpoint            /* Reset this register for next pass. */
           cdata = of_reg
Ok1:       mdata - 255           /* Did it overflow? */
           if(le) goto Ok2
           *cpointer++ = cdatal   /* Write previous byte. */
           mdata = of_reg
Ok2:       ydata - 255           /* Did it overflow? */
           if(le) goto Ok3
           *mpointer++ = mdatal   /* Write previous byte. */
           ydata = of_reg
Ok3:       kdata - 255           /* Did it overflow? */
           if(le) goto Ok4
```

```
        *ypointer++ = ydata1    /* Write previous byte. */
        kdata = of_reg
Ok4:
        *kpointer++ = kdata1    /* Write previous byte. */
        /* Keep going until we do all pixels. */
        if (counter-->=0) goto Getdata
        cwpointer = Ocolors Complete: r14 = 0x69
        goto Wait_for_go                /* Go wait for next line. */
        *Doneflag=r14                   /* Signal PC that DSP32 is done. */

Zero:       float 0.0
Dpoint:     4 * int
Ocolors:    4 * float       /* Original colors. */
Colors:     4 * float       /* Calculated colors. */
Levels:     8 * int         /* Calculated color levels. */
TLU:        int Table_base  /* Table lookup. */
            int Table_base+(4*  32)
            int Table_base+(4*  64)
            int Table_base+(4*  96)
            int Table_base+(4*128)
            int Table_base+(4*160)
            int Table_base+(4*192)
            int Table_base+(4*224)
            int Table_base+(4*256)
            int Table_base+(4*288)
            int Table_base+(4*320)
            int Table_base+(4*352)
            int Table_base+(4*384)
            int Table_base+(4*416)
            int Table_base+(4*448)
            int Table_base+(4*480)
            int Table_base+(4*512)
            int Table_base+(4*544)
            int Table_base+(4*576)
            int Table_base+(4*608)
            int Table_base+(4*640)
            int Table_base+(4*672)
            int Table_base+(4*704)
            int Table_base+(4*736)
            int Table_base+(4*768)
            int Table_base+(4*800)
            int Table_base+(4*832)
            int Table_base+(4*864)
            int Table_base+(4*896)
            int Table_base+(4*928)
            int Table_base+(4*960)
            int Table_base+(4*992)
            int Table_base+(4*1024)
            int Table_base+(4*1056)
            int Table_base+(4*1088)
            int Table_base+(4*1120)
            int Table_base+(4*1152)
            int Table_base+(4*1184)
            int Table_base+(4*1216)
            int Table_base+(4*1248)
            int Table_base+(4*1280)
            int Table_base+(4*1312)
            int Table_base+(4*1344)
            int Table_base+(4*1376)
            int Table_base+(4*1408)
            int Table_base+(4*1440)
            int Table_base+(4*1472)
            int Table_base+(4*1504)
            int Table_base+(4*1536)
            int Table_base+(4*1568)
            int Table_base+(4*1600)
            int Table_base+(4*1632)
            int Table_base+(4*1664)
```

```
int Table_base+(4*1696)
int Table_base+(4*1728)
int Table_base+(4*1760)
int Table_base+(4*1792)
int Table_base+(4*1824)
int Table_base+(4*1856)
int Table_base+(4*1888)
int Table_base+(4*1920)
int Table_base+(4*1952)
int Table_base+(4*1984)
int Table_base+(4*2016)
int Table_base+(4*2048)
int Table_base+(4*2080)
int Table_base+(4*2112)
int Table_base+(4*2144)
int Table_base+(4*2176)
int Table_base+(4*2208)
int Table_base+(4*2240)
int Table_base+(4*2272)
int Table_base+(4*2304)
int Table_base+(4*2336)
int Table_base+(4*2368)
int Table_base+(4*2400)
int Table_base+(4*2432)
int Table_base+(4*2464)
int Table_base+(4*2496)
int Table_base+(4*2528)
int Table_base+(4*2560)
int Table_base+(4*2592)
int Table_base+(4*2624)
int Table_base+(4*2656)
int Table_base+(4*2688)
int Table_base+(4*2720)
int Table_base+(4*2752)
int Table_base+(4*2784)
int Table_base+(4*2816)
int Table_base+(4*2848)
int Table_base+(4*2880)
int Table_base+(4*2912)
int Table_base+(4*2944)
int Table_base+(4*2976)
int Table_base+(4*3008)
int Table_base+(4*3040)
int Table_base+(4*3072)
int Table_base+(4*3104)
int Table_base+(4*3136)
int Table_base+(4*3168)
int Table_base+(4*3200)
int Table_base+(4*3232)
int Table_base+(4*3264)
int Table_base+(4*3296)
int Table_base+(4*3328)
int Table_base+(4*3360)
int Table_base+(4*3392)
int Table_base+(4*3424)
int Table_base+(4*3456)
int Table_base+(4*3488)
int Table_base+(4*3520)
int Table_base+(4*3552)
int Table_base+(4*3584)
int Table_base+(4*3616)
int Table_base+(4*3648)
int Table_base+(4*3680)
int Table_base+(4*3712)
int Table_base+(4*3744)
int Table_base+(4*3776)
int Table_base+(4*3808)
int Table_base+(4*3840)
int Table_base+(4*3872)
int Table_base+(4*3904)
```

```
            int   Table_base+(4*3936)
            int   Table_base+(4*3968)
            int   Table_base+(4*4000)
            int   Table_base+(4*4032)
            int   Table_base+(4*4064)

.=0X00800
Points:     int
Inv_data:   int
Indata1:    int
Indata2:    int
Indata3:    int
Indata4:    int
Startflag:  int
Doneflag:   int
```

I claim:

1. A method for processing original color separation image density values comprising:

generating original color separating image density values of pixels of an original image, the number of the original values corresponding to a first set of n colors, where n is at least 2, generating, for each pixel, two matrixes, a 1 by $2^n-1$ matrix V of intermediate color values relating to the original values for the first set of n colors, and a 1 by $2^n-1$ matrix D of color indexes also relating to the original values for the first set of n colors, calculating, for each pixel, a corrected set of n color separation values, $F_i = \{F_1, F_2, \ldots, F_n\}$, utilizing the generated matrix $V_j$ of intermediate color values, the generated matrix $D_j$ of color indexes, and coefficients $E_{ijDj}$ selected from a three dimensional matrix $E_{ijm}$ of preselected color coefficients utilizing the equation:

$$F_i = \sum_{j=1}^{2^n-1} (V_j)(E_{ijDj}),$$

and using the calculated corrected set of n color separation values, $F_i = \{F_1, F_2 \ldots F_n\}$, for each pixel to control a color output device to produce a faithful color reproduction of the image.

2. The method of claim 1, wherein the first set of colors includes cyan (C), magenta (M), yellow (Y) and black (K).

3. The method of claim 2, wherein the matrix $V_j$ of intermediate color values are generated using the following equations:

| | |
|---|---|
| $V_{15} = \min(C_o, M_o, Y_o, K_o)$ | (Value for CMYK) |
| $V_{14} = \min(C_o, Y_o, K_o) - V_{15}$ | (Value for CYK) |
| $V_{13} = \min(C_o, M_o, K_o) - V_{15}$ | (Value for CMK) |
| $V_{12} = \min(M_o, Y_o, K_o) - V_{15}$ | (Value for MYK) |
| $V_{11} = \min(C_o, M_o, Y_o) - V_{15}$ | (Value for CMY) |
| $V_{10} = \min(Y_o, K_o) - V_{12} - V_{14} - V_{15}$ | (Value for YK) |
| $V_9 = \min(M_o, K_o) - V_{12} - V_{13} - V_{15}$ | (Value for MK) |
| $V_8 = \min(C_o, K_o) - V_{13} - V_{14} - V_{15}$ | (Value for YK) |
| $V_7 = \min(C_o, M_o) - V_{11} - V_{13} - V_{15}$ | (Value for CM) |
| $V_6 = \min(C_o, Y_o) - V_{11} - V_{14} - V_{15}$ | (Value for CY) |
| $V_5 = \min(M_o, Y_o) - V_{11} - V_{12} - V_{15}$ | (Value for MY) |
| $V_4 = K_o - V_8 - V_9 - V_{10} - V_{12} - V_{13} - V_{14} - V_{15}$ | (Value for K) |
| $V_3 = Y_o - V_5 - V_7 - V_{10} - V_{11} - V_{12} - V_{14} - V_{15}$ | (Value for Y) |
| $V_2 = M_o - V_5 - V_6 - V_9 - V_{11} - V_{12} - V_{13} - V_{15}$ | (Value for M) |
| $V_1 = C_o - V_6 - V_7 - V_8 - V_{11} - V_{13} - V_{14} - V_{15}$ | (Value for C) | where min(x, y) denotes a function which returns the minimum value of x or y, and where $C_o$, $M_o$, $Y_o$ and $K_o$ are the original values corresponding to cyan, magenta, yellow, and black, respectively.

4. The method of claim 2, wherein the matrix $D_j$ of index values are generated using the following equations:

| | |
|---|---|
| $D_{15} = \min(C_o, M_o, Y_o, K_o)$ | (Index for CMYK) |
| $D_{14} = \min(C_o, Y_o, K_o)$ | (Index for CYK) |
| $D_{13} = \min(C_o, M_o, K_o)$ | (Index for CMK) |
| $D_{12} = \min(M_o, Y_o, K_o)$ | (Index for MYK) |
| $D_{11} = \min(C_o, M_o, Y_o)$ | (Index for CMY) |
| $D_{10} = \min(Y_o, K_o)$ | (Index for YK) |
| $D_9 = \min(M_o, K_o)$ | (Index for MK) |
| $D_8 = \min(C_o, K_o)$ | (Index for YK) |
| $D_7 = \min(C_o, M_o)$ | (Index for CM) |
| $D_6 = \min(C_o, Y_o)$ | (Index for CY) |
| $D_5 = \min(M_o, Y_o)$ | (Index for MY) |
| $D_4 = K_o$ | (Index for K) |
| $D_3 = Y_o$ | (Index for Y) |
| $D_2 = M_o$ | (Index for M) |
| $D_1 = C_o$ | (Index for C) | where min(x, y) denotes a function which returns the minimum value of x or y, and where $C_o$, $M_o$, $Y_o$ and $K_o$ are the original values corresponding to cyan, magenta, yellow, and black, respectively.

5. The method of claim 1, wherein the first set of colors comprise cyan, magenta and yellow.

6. The method of claim 5, wherein the matrix $V_j$ of intermediate values are generated using the following equations:

| | |
|---|---|
| $V_7 = \min(C_o, M_o, Y_o)$ | (Value for CMY) |
| $V_6 = \min(C_o, M_o) - V_7$ | (Value for CM) |
| $V_5 = \min(C_o, Y_o) - V_7$ | (Value for CY) |
| $V_4 = \min(M_o, Y_o) - V_7$ | (Value for MY) |
| $V_3 = Y_o - V_4 - V_5 - V_7$ | (Value for Y) |
| $V_2 = M_o - V_4 - V_6 - V_7$ | (Value for M) |
| $V_1 = C_o - V_5 - V_6 - V_7$ | (Value for C) | where min (x, y) denotes a function which returns the minimum value of x or y, and where $C_o$, $M_o$ and $Y_o$ are the original values corresponding to cyan, magenta and yellow, respectively.

7. The method of claim 5, wherein the matrix $D_j$ of index values are generated using the following equations:

| | |
|---|---|
| $D_7 = \min(C_o, M_o, Y_o)$ | (Index for CMY) |
| $D_6 = \min(C_o, M_o)$ | (Index for CM) |
| $D_5 = \min(C_o, Y_o)$ | (Index for CY) |
| $D_4 = \min(M_o, Y_o)$ | (Index for MY) |
| $D_3 = Y_o$ | (Index for Y) |
| $D_2 = M_o$ | (Index for M) |
| $D_1 = C_o$ | (Index for C) | where min (x, y) denotes a function which returns the minimum value of x or y, and where $C_o$, $M_o$ and $Y_o$ are the original values corresponding to cyan, magenta, yellow, and black, respectively.

8. The method of claim 1, wherein m is a number of distinct gradation levels for which there is a set of $E_{ij}$ coefficients.

9. The method of claim 1, wherein m is 4.

10. The method of claim 1, wherein m is 64.

11. The method of claim 1, wherein the matrix $E_{ijm}$ of preselected color coefficients is preselected by the following steps:
   (a) generating an electronic test pattern image comprising areas consisting of a plurality of pixels having reference color separation image density values corresponding to the intermediate colors at a plurality of predetermined gradation levels,
   (b) producing a first copy of the electronic test pattern image using a process that one desires to match,
   (c) measuring the hues of each of the intermediate colors on the produced first copy of the test pattern image at each gradation level, the measured hues being reference data,
   (d) producing another copy of the electronic test pattern image using a process that one desires to utilize to make a faithful color reproduction of the first copy,
   (e) measuring the hues of each of the intermediate colors on the produced another copy of the test pattern image at each gradation level,
   (f) determining any differences between the reference data and the hues measured in step (e) and modifying coefficients in a three dimensional unity matrix for use as the matrix $E_{ijm}$ in a manner to improve the color accuracy of the process used in step (d),
   (g) calculating a corrected set of n color separation values, $F_i = [F_1, F_2, \ldots, F_n]$, for each pixel or uniform area, by performing the generating and calculating steps of claim 1, utilizing the reference color separation image density values as the original values and the modified three dimensional unity matrix as the matrix $E_{ijm}$, and
   (h) repeating the steps (d) through (g), except in step (c) the corrected set of 4 color separation values, $F_i = [F_1, F_2, F_3, F_4]$, are used instead of the reference color separation image density values to produce another copy, in step (f) the modified unity matrix is further modified and in step (g) the most recently modified unity matrix is used as matrix $E_{ij}$ until the differences determined in step (f) are reduced to a predetermined level.

12. The method of claim 9, wherein the matrix $E_{ijm}$ of preselected color coefficients is preselected utilizing an appropriately trained parallel processing network.

13. The method of claim 12, wherein the processing network effectively performs the steps (d) and (e) of claim 10.

14. The method of claim 1, wherein m has 4 levels, and the matrix $E_{ijm}$ has the following preselected color coefficients:

| | j = 1 | j = 2 | j = 3 | j = 4 | j = 5 | j = 6 | j = 7 | j = 8 | j = 9 | j = 10 | j = 11 | j = 12 | j = 13 | j = 14 | j = 15 | |
|---|---|---|---|---|---|---|---|---|---|---|---|---|---|---|---|---|
| m | C | M | Y | K | B | A | G | CK | MK | YK | $K_3$ | BK | AK | GK | $K_4$ | i |
| 1 | 0.80 | 0.00 | 0.00 | 0.00 | 0.00 | 0.92 | 0.94 | 1.09 | 0.00 | 0.00 | 1.00 | 0.00 | 1.02 | 0.98 | 1.02 | 1 |
|  | 0.00 | 0.77 | 0.00 | 0.00 | 0.70 | 0.00 | 0.94 | 0.00 | 1.05 | 0.00 | 0.95 | 1.00 | 0.00 | 1.00 | 1.00 | 2 |
|  | 0.00 | 0.00 | 1.08 | 0.00 | 1.02 | 0.92 | 0.05 | 0.03 | 0.16 | 1.19 | 1.09 | 1.25 | 1.12 | 0.00 | 1.23 | 3 |
|  | 0.00 | 0.00 | 0.00 | 1.09 | 0.00 | 0.00 | 0.09 | 1.20 | 1.09 | 0.97 | 0.00 | 1.00 | 1.09 | 1.23 | 1.09 | 4 |
| 2 | 0.82 | 0.00 | 0.00 | 0.00 | 0.00 | 0.86 | 0.88 | 1.00 | −0.04 | 0.00 | 0.98 | 0.00 | 1.00 | 0.90 | 0.98 | 1 |
|  | 0.00 | 0.80 | 0.00 | 0.04 | 0.75 | 0.00 | 0.88 | 0.00 | 0.94 | 0.00 | 0.88 | 0.78 | 0.00 | 0.90 | 0.88 | 2 |
|  | 0.00 | 0.00 | 1.14 | 0.16 | 1.01 | 1.00 | 0.00 | 0.00 | 0.06 | 1.11 | 1.05 | 1.17 | 1.18 | 0.00 | 1.20 | 3 |
|  | 0.00 | 0.00 | 0.00 | 1.00 | 0.00 | 0.00 | 0.14 | 1.16 | 1.05 | 0.91 | 0.00 | 1.01 | 1.00 | 1.13 | 1.00 | 4 |
| 3 | 0.78 | 0.00 | 0.00 | 0.00 | 0.00 | 0.81 | 0.78 | 0.99 | 0.00 | 0.00 | 0.95 | 0.00 | 0.96 | 0.78 | 0.95 | 1 |
|  | 0.00 | 0.79 | 0.00 | 0.00 | 0.79 | 0.00 | 0.76 | 0.00 | 0.86 | 0.00 | 0.82 | 0.78 | 0.00 | 0.78 | 0.89 | 2 |
|  | 0.00 | 0.00 | 1.30 | 0.15 | 1.00 | 1.00 | 0.00 | 0.00 | 0.00 | 1.25 | 1.01 | 1.06 | 1.15 | 0.02 | 1.03 | 3 |
|  | 0.00 | 0.00 | 0.00 | 1.04 | 0.00 | 0.00 | 0.13 | 1.12 | 1.07 | 0.94 | 0.00 | 1.00 | 0.98 | 1.15 | 1.00 | 4 |
| 4 | 0.73 | 0.00 | 0.00 | 0.01 | 0.00 | 0.74 | 0.78 | 1.00 | 0.00 | 0.00 | 0.86 | 0.00 | 0.96 | 0.96 | 0.97 | 1 |
|  | 0.00 | 0.74 | 0.00 | 0.02 | 0.82 | 0.00 | 0.75 | 0.04 | 0.82 | −0.02 | 0.75 | 0.80 | 0.00 | 0.88 | 0.86 | 2 |
|  | 0.02 | 0.00 | 1.00 | 0.13 | 1.00 | 1.00 | 0.00 | 0.05 | 0.00 | 1.00 | 1.00 | 1.00 | 1.04 | 0.02 | 1.00 | 3 |
|  | 0.00 | 0.00 | 0.00 | 1.00 | 0.00 | 0.00 | 0.05 | 1.00 | 1.00 | 0.95 | 0.00 | 1.00 | 1.00 | 1.00 | 1.00 | 4 |

15. The method of claim 1, wherein there are less than $D_j$ distinct gradation levels m for which there is a set of $E_{ij}$ coefficients and the method further comprises: in the calculating step, rounding to the closest available m coefficient value.

16. The method of claim 1, wherein there are less than $D_j$ distinct gradation levels m for which there is a set of $E_{ij}$ coefficients and the method further comprises: in the calculating step, interpolating to determine the m coefficient value.

17. The method of claim 1, wherein there are less than $D_j$ distinct gradation levels m for which there is a set of $E_{ij}$ coefficients and the method further comprises: in the calculating step, extrapolating to determine the m coefficient value.

* * * * *